US009299278B2

(12) United States Patent
Oh

(10) Patent No.: US 9,299,278 B2
(45) Date of Patent: Mar. 29, 2016

(54) LAMP INCLUDING A LIGHT SOURCE MODULE AND AN OPTICAL MEMBER HAVING A PLURALITY OF PATTERNS

(71) Applicant: LG INNOTEK CO., LTD., Seoul (KR)

(72) Inventor: Nam Seok Oh, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 314 days.

(21) Appl. No.: 13/739,188

(22) Filed: Jan. 11, 2013

(65) Prior Publication Data

US 2014/0133128 A1    May 15, 2014

(30) Foreign Application Priority Data

Nov. 14, 2012 (KR) .......................... 10-2012-0128567

(51) Int. Cl.
*G09F 13/20* (2006.01)
*F21V 8/00* (2006.01)
*G09F 13/08* (2006.01)
*G09F 13/22* (2006.01)

(52) U.S. Cl.
CPC .............. *G09F 13/20* (2013.01); *G02B 6/0036* (2013.01); *G02B 6/0038* (2013.01); *G09F 13/08* (2013.01); *G09F 2013/222* (2013.01); *G09F 2013/227* (2013.01)

(58) Field of Classification Search
CPC ......... G09F 13/08; G09F 13/10; G09F 13/20; G09F 21/04; G09F 21/048; G02B 6/0036; G02B 6/0038; G02B 6/0018; G02B 6/0035; G02B 6/004; G02B 6/0043; G02F 1/133606
USPC .............. 362/307–309, 311.02, 311.06, 97.1, 362/97.4, 355; 40/575, 564, 541–544, 442
See application file for complete search history.

(56) References Cited

U.S. PATENT DOCUMENTS

| 3,780,462 | A | * | 12/1973 | Pregel et al. ..................... 40/544 |
| 5,099,401 | A | | 3/1992 | Kondo et al. |
| 5,249,104 | A | * | 9/1993 | Mizobe ......................... 362/605 |
| 5,404,282 | A | | 4/1995 | Klinke et al. ................... 362/249 |
| 5,436,809 | A | | 7/1995 | Brassier et al. |
| 5,455,747 | A | | 10/1995 | Aoyama |
| 5,490,049 | A | | 2/1996 | Montalan et al. |
| 5,519,596 | A | | 5/1996 | Woolverton .................. 362/250 |
| 5,724,108 | A | | 3/1998 | Shibata |
| 6,299,337 | B1 | | 10/2001 | Bachl et al. |
| 6,543,923 | B2 | | 4/2003 | Tamai ........................... 362/521 |
| 7,458,714 | B2 | * | 12/2008 | Chang .......................... 362/626 |

(Continued)

OTHER PUBLICATIONS

United States Office Action dated Oct. 1, 2014 issued in U.S. Appl. No. 13/684,708.

(Continued)

*Primary Examiner* — Robert May
(74) *Attorney, Agent, or Firm* — KED & Associates LLP

(57) ABSTRACT

Disclosed are a lamp capable of displaying an emblem and a vehicle lamp apparatus using the same. The lamp includes a light source module and an optical member spaced apart from the light source module by a predetermined distance. The optical member includes at least one plate including a bottom surface adjacent to the light source module and a top surface opposite the bottom surface, a first pattern disposed at the top surface of the plate to display a predetermined emblem, and a second pattern disposed at the top surface of the plate excluding the first pattern to condense light incident from the light source module.

18 Claims, 44 Drawing Sheets

(56) References Cited

U.S. PATENT DOCUMENTS

| | | | |
|---|---|---|---|
| 7,478,913 B2* | 1/2009 | Epstein | G02B 5/045 349/62 |
| 7,708,438 B2 | 5/2010 | Yajima et al. | 362/494 |
| 7,806,567 B2* | 10/2010 | Chen | G02B 3/0056 349/64 |
| 7,806,580 B2* | 10/2010 | Lin | 362/606 |
| 2003/0147253 A1 | 8/2003 | Shy | |
| 2004/0223327 A1 | 11/2004 | Kuan et al. | |
| 2004/0223328 A1 | 11/2004 | Lee et al. | 362/249 |
| 2005/0195074 A1 | 9/2005 | Kano | 340/475 |
| 2005/0225994 A1 | 10/2005 | Rodriguez Barros et al. | |
| 2005/0237760 A1 | 10/2005 | Tsukamoto et al. | 362/545 |
| 2006/0092658 A1 | 5/2006 | Scholz | 362/545 |
| 2006/0133104 A1 | 6/2006 | Okubo et al. | |
| 2006/0262533 A1 | 11/2006 | Lin | |
| 2007/0201225 A1 | 8/2007 | Holder et al. | |
| 2008/0030994 A1* | 2/2008 | Chang | G02B 3/0056 362/330 |
| 2009/0073709 A1 | 3/2009 | Yajima et al. | 362/494 |
| 2010/0008088 A1 | 1/2010 | Koizumi et al. | 362/235 |
| 2010/0157595 A1 | 6/2010 | Lin et al. | 362/235 |
| 2010/0214799 A1 | 8/2010 | Ohmi et al. | 362/545 |
| 2010/0232173 A1 | 9/2010 | Ohno et al. | |
| 2010/0277666 A1 | 11/2010 | Bertram et al. | 349/61 |
| 2010/0290241 A1 | 11/2010 | Tsukamoto | 362/519 |
| 2011/0170307 A1 | 7/2011 | Ishikawa et al. | 362/516 |
| 2011/0228536 A1 | 9/2011 | Im et al. | 362/249.06 |
| 2012/0039084 A1 | 2/2012 | Eckhardt et al. | |
| 2012/0182731 A1 | 7/2012 | Kretschmann et al. | 362/235 |
| 2012/0182755 A1 | 7/2012 | Wildner | 362/555 |
| 2012/0287628 A1 | 11/2012 | Markell | |
| 2013/0265791 A1 | 10/2013 | Dassanayake et al. | |

OTHER PUBLICATIONS

United States Office Action dated Dec. 3, 2014 issued in U.S. Appl. No. 13/912,701.

United States Final Office Action dated Mar. 19, 2015 issued in U.S. Appl. No. 13/684,708.

United States Final Office Action dated Mar. 23, 2015 issued in U.S. Appl. No. 13/912,701.

Final U.S. Office Action for U.S. Appl. No. 13/912,701 dated Dec. 11, 2015.

* cited by examiner

LAMP INCLUDING A LIGHT SOURCE MODULE AND AN OPTICAL MEMBER HAVING A PLURALITY OF PATTERNS

CROSS REFERENCE TO RELATED APPLICATION

This application claims priority under 35 U.S.C. §119 to Korean Patent Application No. 10-2012-0128567, filed in Korea on Nov. 14, 2012 which is hereby incorporated in its entirety by reference as if fully set forth herein.

TECHNICAL FIELD

Embodiments relate to a lamp capable of displaying an emblem and a vehicle lamp apparatus using the same.

BACKGROUND

Generally, a lamp supplies or adjusts light for a specific purpose.

An incandescent lamp, fluorescent lamp, neon lamp and the like may be used as a light source of the lamp. A light emitting diode (LED) may also be used as the light source of the lamp.

An LED may convert an electric signal into infrared rays or light using characteristics of a compound semiconductor. Unlike the fluorescent lamp, the LED does not use a noxious material, such as mercury.

The LED may also have a longer lifespan than the incandescent lamp, fluorescent lamp, and neon lamp and LED power consumption may be lower than that of the incandescent lamp, fluorescent lamp, and neon lamp. In addition, the LED exhibits excellent visibility and low glare due to its high color temperature.

A lamp including such an LED may be used in a backlight, display device, lighting, indicator lights for vehicles, head lamps and various other applications.

BRIEF DESCRIPTION OF THE DRAWINGS

The embodiments will be described in detail with reference to the following drawings in which like reference numerals refer to like elements wherein.

Arrangements and embodiments may be described in detail with reference to the following drawings in which like reference numerals refer to like elements and wherein.

DETAILED DESCRIPTION

Figure 1A:
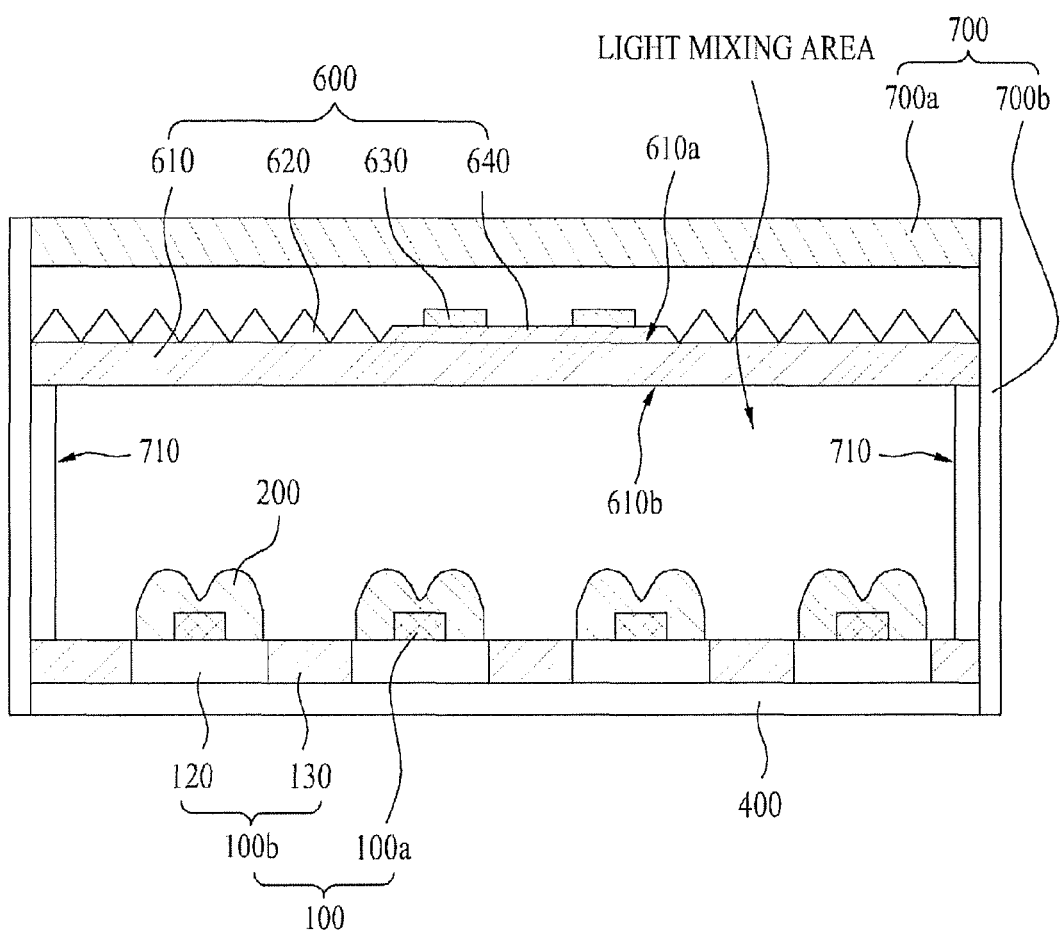
FIG. 1A is a sectional view illustrating a lamp according to a first embodiment.

Hereinafter, embodiments will be described with reference to the annexed drawings.

In a description of embodiments of the present invention, it will be understood that, when an element, such as a layer (film), a region, a pattern or a structure is referred to as being "on" or "under" another element, such as a substrate, a layer (film), a region, a pad or a pattern, it can be directly on the other element or intervening elements may also be present. Further, "on" or "under" the element may be described relative to the drawings.

In the drawings, the thickness or size of each layer is exaggerated, omitted, or schematically illustrated for convenience of description and clarity. Also, the size or area of each constituent element does not entirely reflect the actual size thereof.

Figure 1B:
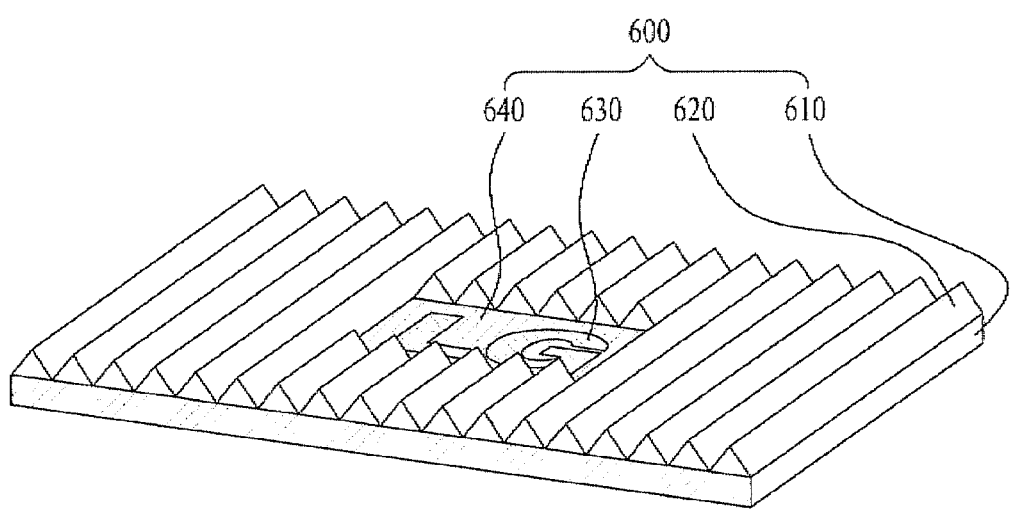
FIG. 1B is a perspective view showing an optical member of FIG. 1A.

FIG. 1A is a sectional view illustrating a lamp according to a first embodiment, and FIG. 1B is a perspective view showing an optical member of FIG. 1A.

As shown in FIGS. 1A and 1B, the lamp may include a light source module 100, a heat dissipation member 400, an optical member 600, and a cover member 700.

The light source module 100 may include a substrate 100$b$ having an electrode pattern and a plurality of light sources 100$a$ arranged on the substrate 100$b$.

The substrate 100$b$ of the light source module 100 may include a plurality of supporting portions 120 disposed so as to correspond to the respective light sources 100$a$ and a plurality of connecting portions 130 disposed between neighboring supporting portions 120.

The substrate 100$b$ of the light source module 100 may be manufactured so as to exhibit flexibility. The substrate 100$b$ of the light source module 100 may be a printed circuit board (PCB) made of any one selected from among polyethylene terephthalate (PET), glass, polycarbonate (PC), silicon (Si), polyimide, and epoxy. The substrate 100$b$ of the light source module 100 may be formed in a film shape.

Also, a single layer PCB, multi layer PCB, ceramic substrate, or metal core PCB may be selectively used as the substrate 100$b$ of the light source module 100.

The entirety of the substrate 100$b$ of the light source module 100 may be formed of the same material. According to circumstances, a portion of the substrate 100$b$ may be formed of a material different from that of the remaining portion of the substrate 100$b$.

For example, the supporting portions 120 and the connecting portions 130 of the substrate 100$b$ may be formed of the same material. As an example, the supporting portions 120 and the connecting portions 130 of the substrate 100$b$ may each include a base member and a circuit pattern disposed on at least one surface of the base member. The base member may be formed of a film, such as a polyimide or epoxy (for example, FR-4) film, exhibiting flexibility and insulativity.

According to circumstances, the supporting portions 120 and the connecting portions 130 of the substrate 100$b$ may be formed of different materials.

As an example, the supporting portions 120 of the substrate 100$b$ may be conductors, and the connecting portions 130 of the substrate 100$b$ may be nonconductors.

Also, the supporting portions 120 of the substrate 100$b$ may be formed of a hard material which is not flexible to support the respective light sources 100$a$, and the connecting portions 130 of the substrate 100$b$ may be formed of a soft material which is flexible. Consequently, the substrate 100$b$ of the light source module 100 may be manufactured so as to be applied to an object having curvature.

As described above, the substrate 100$b$ of the light source module 100 may be formed of the soft material, and therefore, the substrate 100$b$ may be curved. However, the substrate 100$b$ of the light source module 100 may be curved due to structural deformation thereof.

For example, the supporting portions 120 of the substrate 100$b$ may have a first thickness, and the connecting portions 130 of the substrate 100$b$ may have a second thickness. The first thickness may be different from the second thickness so that the substrate 100$b$ can be curved.

As an example, if the second thickness of the connecting portions 130 of the substrate 100$b$ is less than the first thickness of the supporting portions 120 of the substrate 100$b$, the substrate 100$b$ may be curved due to the connecting portions 130 of the substrate 100$b$, and therefore, the substrate 100$b$ of the light source module 100 may be applied to an object having curvature.

Also, a reflective coating film or reflective coating material layer may be formed at the substrate 100$b$ of the light source module 100 to reflect light generated by the light sources 100$a$ toward the optical member 600.

The reflective coating film or reflective coating material layer may contain a metal, such as aluminum (Al), silver (Ag), or gold (Au), exhibiting high reflectance or a metal oxide, such as titanium oxide ($TiO_2$), exhibiting high reflectance.

According to circumstances, a plurality of heat dissipation pins to dissipate heat generated from the light sources 100$a$ may be arranged at the substrate 100$b$ of the light source module 100.

As an example, the heat dissipation pins may be disposed throughout the entire area of the substrate 100$b$ including the supporting portions 120 and the connecting portions 130 or only at the supporting portions 120 of the substrate 100$b$ supporting the light sources 100$a$.

Conductive patterns to apply current to drive the light sources 100$a$ may be disposed at the substrate 100$b$ of the light source module 100.

As an example, the conductive patterns may be disposed throughout the entire area of the substrate 100$b$ including the supporting portions 120 and the connecting portions 130, only at the supporting portions 120 of the substrate 100$b$ supporting the light sources 100$a$, or only at the connecting portions 130 of the substrate 100$b$ interconnecting neighboring supporting portions 120 to electrically interconnect neighboring light sources 100$a$.

Each light source 100$a$ of the light source module 100 may be a top view type light emitting diode. According to circumstances, each light source 100$a$ of the light source module 100 may be a side view type light emitting diode.

Each light source 100$a$ of the light source module 100 may be a light emitting diode (LED) chip. The LED chip may be a red LED chip, blue LED chip, or ultraviolet LED chip. Alternatively, the LED chip may be at least one selected from among a red LED chip, green LED chip, blue LED chip, yellow green LED chip, and white LED chip, or a combination thereof.

A white LED may be realized using a yellow phosphor on a blue LED or simultaneously using a red phosphor and green phosphor on a blue LED. Also, a white LED may be realized simultaneously using a yellow phosphor, red phosphor, and green phosphor on a blue LED.

As an example, in a case in which the lamp is applied to a taillight of a vehicle, each light source 100a of the light source module 100 may be a vertical lighting emitting chip, such as a red lighting emitting chip. However, embodiments are not limited thereto.

Each light source 100a of the light source module 100 may include a lens 200. The lens 200 may include a groove disposed at a position corresponding to the central area of a light emission surface of each light source 100a.

Also, a groove may be provided at the bottom surface of the lens 200 corresponding to each light source 100a.

The groove may be formed in a conical or trapezoidal shape having a wide top and a narrow bottom in section.

The groove is formed at the lens 200 to widen an orientation angle of light emitted from each light source 100a. However, embodiments are not limited thereto, and various types of lenses may be used.

Meanwhile, the optical member 600 may be spaced apart from the substrate 100b by a predetermined distance. A light mixing area may be formed between the substrate 100b and the optical member 600.

The cover member 700 may be omitted, and the optical member 600 may function as the cover member 700.

According to circumstances, the optical member 600 may be omitted, and only the cover member 700 may be provided.

As shown in FIG. 1B, the optical member 600 may include at least one plate 610.

The plate 610 may be a light transmissive member or a light semi-transmissive member.

For example, the plate 610 may be generally formed of acryl resin. However, embodiments are not limited thereto. In addition, the plate 610 may be formed of a material having a light diffusion function, for example, highly-transmissive plastic, such as polystyrene (PS), polymethyl methacrylate (PMMA), cyclic olefin copolymer (COC), polyethylene terephthalate (PET), or resin.

The plate 610 may include a bottom surface 610b adjacent to the light source module 100 and a top surface 610a opposite the bottom surface 610b. At the top surface 610a of the plate 610 may be disposed a first pattern 630 to display a predetermined emblem.

The emblem may be a symbol, letter, figure, three-dimensional shape, a combination thereof, or a combination thereof with a color.

At the top surface 610a of the plate 610 excluding the first pattern 630 may be disposed a second pattern 620 to condense light incident from the light source module 100.

Between the first pattern 630 and the second pattern 620 may be disposed a ground pattern 640 surrounding the first pattern 630.

The ground pattern 640 may be different from the second pattern 620. According to circumstances, the ground pattern 640 may be identical to the second pattern 620.

The first pattern 630 may be at least one selected from among an embossed pattern, an engraved pattern, and a printed pattern. According to circumstances, the first pattern 630 may contain a plurality of fluorescent particles.

The second pattern 620 may be a protrusion protruding upward from the top surface of the plate 610. The vertical section of the protrusion may include a first surface and second surface facing each other. The angle between the first surface and second surface may be an obtuse angle or acute angle.

In this embodiment, the second pattern 620 may include a plurality of protrusions arranged side by side in one direction. The protrusions may be formed in a stripe shape.

Also, the optical member 600 may include a third pattern (not shown) disposed at the bottom surface 610b of the plate 610 to diffuse light incident from the light source module 100.

The third pattern (not shown) may be a groove disposed at the bottom surface 610b of the plate 610. The groove may be concave in vertical section.

The plate 610 of the optical member 600 may include a curved surface having at least one curvature.

The plate 610 of the optical member 600 may have a surface having at least one selected from a concave surface, convex surface, and flat surface according to the shape of the cover member 700 or an object, to which the lamp is mounted.

The distance between the optical member 600 and the light source module 100 may be about 10 mm or more.

If the distance between the optical member 600 and the light source module 100 is less than about 10 mm, the lamp may not exhibit uniform brightness. As a result, a hot spot phenomenon having high brightness at the area at which each light source 100a is located may occur. On the contrary, a dark spot phenomenon having low brightness may occur.

The plate 610, the first pattern 630, the second pattern 620, the third pattern (not shown), and the ground pattern 640 of the optical member 600 may be separately manufactured and then coupled to one another. According to circumstances, the components of the optical member 600 may be selectively integrated.

The heat dissipation member 400 may be disposed under the substrate 100b of the light source module 100.

The heat dissipation member 400 may dissipate heat generated from the light sources 100a.

The heat dissipation member 400 may be formed of a material exhibiting high thermal conductivity, such as aluminum, an aluminum alloy, copper, or a copper alloy.

Alternatively, the substrate 100b of the light source module 100 and the heat dissipation member 400 may be integrated to constitute a metal core printed circuit board (MCPCB), or an additional heat dissipation member 400 may be disposed at the bottom surface of the MCPCB.

In a case in which such an additional heat dissipation member is attached to the bottom surface of the MCPCB, such attachment may be achieved using an acryl bonding agent (not shown).

Generally, when the temperature of each light source 100a is increased by heat generated from each light source 100a, the luminous intensity of each light source 100a may be decreased, and the waveform of generated light may be shifted.

Especially when each light source 100a is a red light emitting diode, the waveform of generated light may be excessively shifted, and the luminous intensity of each light source 100a may be excessively decreased.

On the other hand, when the heat dissipation member 400 is disposed at the bottom surface of the substrate 100b of the light source module 100, heat generated from each light source 100a may be efficiently dissipated, and therefore, the increase in temperature of each light source 100a is suppressed, thereby preventing the luminous intensity of each light source 100a from being decreased and the waveform of generated light from being shifted.

The cover member 700 may include a top cover 700a and a side cover 700b. The top cover 700a may be formed of a light transmissive material, and the side cover 700b may be formed of an opaque material.

According to circumstances, both the top cover 700a and side cover 700b may be formed of a light transmissive material.

The cover member 700 may be formed of a material (for example, acryl) capable of protecting the light source module including the substrate 100b and the light sources 100a from external impact and transmitting light emitted from the light source module.

Also, the cover member 700 may include a curved portion in terms of design. The substrate 100b of the light source module is flexible and thus may be easily received in the curved cover member 700.

A reflector 710 may be disposed at the inside of the side cover 700b of the cover member 700.

A reflective coating film or reflective coating material layer may be formed at the reflector 710. The reflector 710 may reflect light generated by the light sources 100a toward the optical member 600.

The reflector 710 may contain a metal, such as chrome (Cr), aluminum (Al), silver (Ag), or gold (Au), exhibiting high reflectance or a metal oxide, such as titanium oxide ($TiO_2$), exhibiting high reflectance.

The cover member 700 may be disposed in contact with the optical member 600. Only a portion of the cover member 700 may contact the optical member 600, and the remaining portion of the cover member 700 may be spaced apart from the optical member 600 by a predetermined distance.

According to circumstances, the entire surface of the cover member 700 facing the optical member 600 may contact the optical member 600.

Also, the entire surface of the cover member 700 facing the optical member 600 may be spaced apart from the optical member 600 by a predetermined distance.

The distance between the cover member 700 and the optical member 600 may be varied based on design conditions of the light source module required by an object, to which the light source module is mounted, to provide uniform brightness throughout.

According to circumstances, the optical member 600 and the cover member 700 may be integrated.

In this embodiment, the optical member including various patterns is used as described above, and therefore, it is possible to display the emblem and to condense light.

Also, in this embodiment, an additional optical member, such as a prism sheet, may be removed. Consequently, the weight of the lamp is reduced, and manufacturing cost of the lamp is reduced.

Also, in this embodiment, the flexible optical member and light source module are used, and therefore, the lamp may be applied to an object having curvature.

In this embodiment, therefore, it is possible to improve economy of the lamp and a degree of freedom in product design.

Figure 2A:
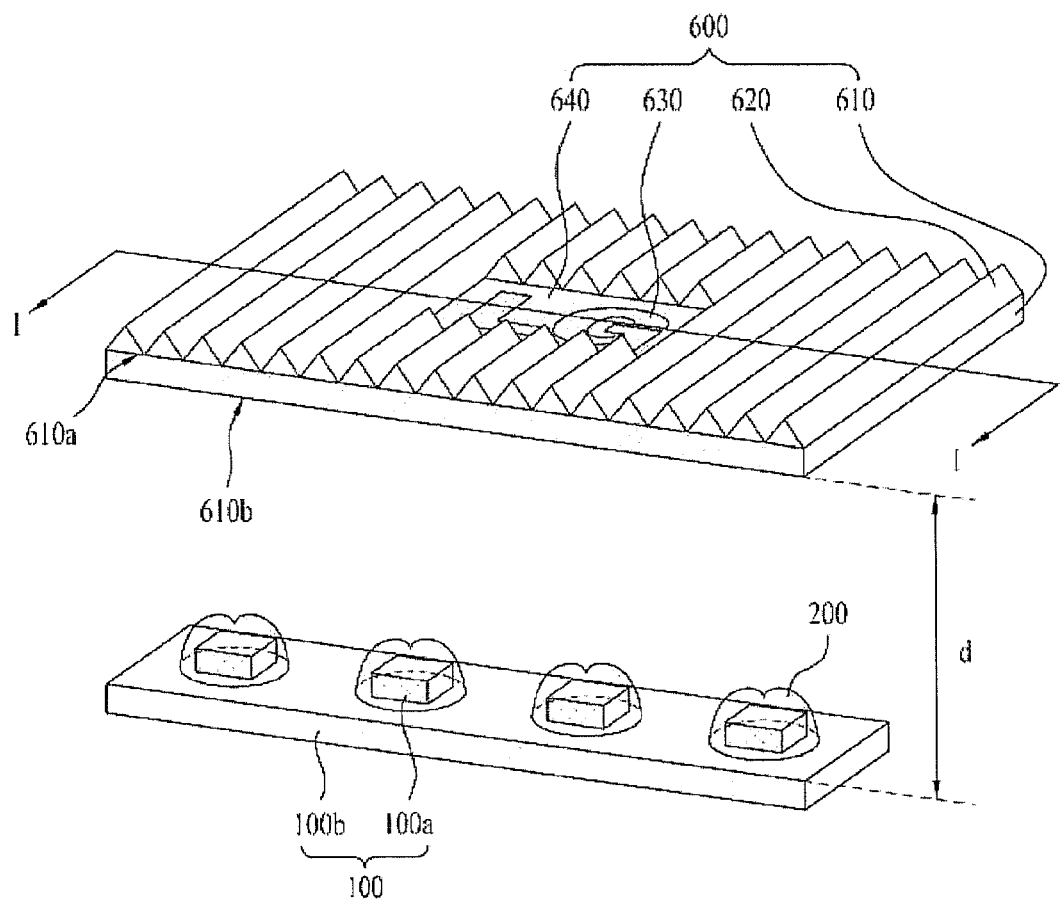
FIG. 2A is a perspective view showing the arrangement of the optical member and a light source module of FIG. 1A.
Figure 2B:
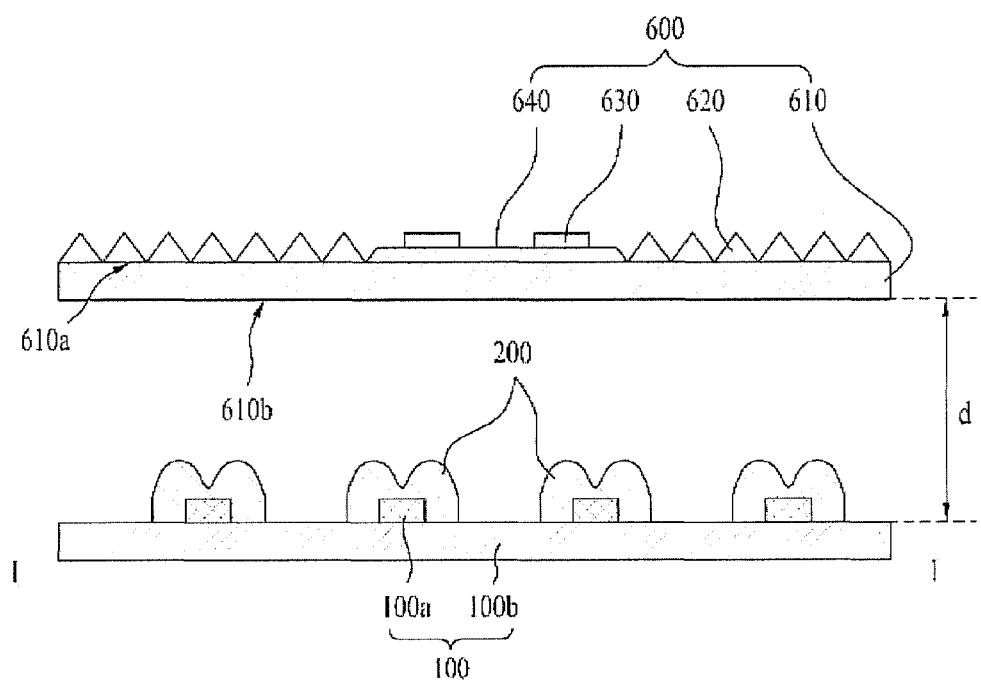
FIG. 2B is a sectional view taken along line I-I of FIG. 2A.

FIG. 2A is a perspective view showing the arrangement of the optical member and the light source module of FIG. 1A, and FIG. 2B is a sectional view taken along line I-I of FIG. 2A.

As shown in FIGS. 2A and 2B, the light source module 100 may include a substrate 100b and a plurality of light sources 100a arranged on the substrate 100b.

Each light source 100a of the light source module 100 may include a lens 200. The lens 200 may include a groove disposed at a position corresponding to the central area of a light emission surface of each light source 100a.

The optical member 600 may be spaced apart from the substrate 100b by a predetermined distance.

The optical member 600 may include a plate 610, a first pattern 630, a second pattern 620, and a ground pattern 640.

The plate 610 may be a light transmissive member or a light semi-transmissive member.

For example, the plate 610 may be generally formed of acryl resin. However, embodiments are not limited thereto. In addition, the plate 610 may be formed of a material having a light diffusion function, for example, highly-transmissive plastic, such as polystyrene (PS), polymethyl methacrylate (PMMA), cyclic olefin copolymer (COC), polyethylene terephthalate (PET), or resin.

The first pattern 630 may be disposed at the top surface 610a of the plate 610. The first pattern 630 may display a predetermined emblem.

The emblem may be a symbol, letter, figure, three-dimensional shape, a combination thereof, or a combination thereof with a color.

The second pattern 620 may be a protrusion protruding upward from the top surface of the plate 610. The vertical section of the protrusion may include a first surface and second surface facing each other. The angle between the first surface and second surface may be an obtuse angle or acute angle.

For example, the second pattern 620 may include a plurality of protrusions arranged side by side in one direction. The protrusions may be formed in a stripe shape.

According to circumstances, the first pattern 630 may be at least one selected from among an embossed pattern, an engraved pattern, and a printed pattern. According to circumstances, the first pattern 630 may contain a plurality of fluorescent particles.

The second pattern 620 may be disposed at the top surface 610a of the plate 610. The second pattern 620 may be disposed at the area of the top surface 610a of the plate 610 excluding the first pattern 630.

The second pattern 620 is a pattern to condense light incident from the light source module 100. The second pattern 620 may transmit a large amount of light in a predetermined reference direction.

The predetermined reference direction may be a direction in which the amount or intensity of light generated from the light sources 100a is measured.

For example, in a case in which the lamp is applied to a taillight of a vehicle, a safety standard of the lamp applied to the taillight of the vehicle must satisfy the following condition. That is, when viewed from a horizontal angle of an outer axle of the vehicle of 45 degrees from the central point of light, a projected area must be about 12.5 $cm^2$ or more, and, for example, the brightness of a brake lamp must be about 40 to 420 candela (cd).

Also, the ground pattern 640 may be disposed at the top surface 610a of the plate 610. The ground pattern 640 may be disposed between the first pattern 630 and the second pattern 620 to surround the first pattern 630.

That is, the ground pattern 640 may be disposed around the first pattern 630 to improve visibility of the emblem displayed by the first pattern 630.

The ground pattern 640 may be different from the second pattern 620. According to circumstances, the ground pattern 640 may be identical to the second pattern 620.

The plate 610 of the optical member 600 may include a top surface 610a at which the first and second patterns 630 and 620 are disposed and a bottom surface 610b facing the substrate 100b of the light source module 100.

The distance between the bottom surface 610b of the plate 610 and the substrate 100b of the light source module 100 may be about 10 mm or more.

If the distance between the optical member 600 and the light source module 100 is less than about 10 mm, the lamp may not exhibit uniform brightness. As a result, a hot spot phenomenon having high brightness at the area at which each light source 100*a* is located may occur. On the contrary, a dark spot phenomenon having low brightness may occur.

The plate 610, the first pattern 630, the second pattern 620, and the ground pattern 640 of the optical member 600 may be separately manufactured and then coupled to one another. According to circumstances, the components of the optical member 600 may be selectively integrated.

In this embodiment, the optical member including the first pattern, second pattern, and ground pattern is used as described above, and therefore, it is possible to display the emblem and, at the same time, to condense light, thereby providing high brightness.

In this embodiment, therefore, it is possible to provide a lamp capable of exhibiting high brightness and having excellent advertisement and public information effects.

Figure 3A:
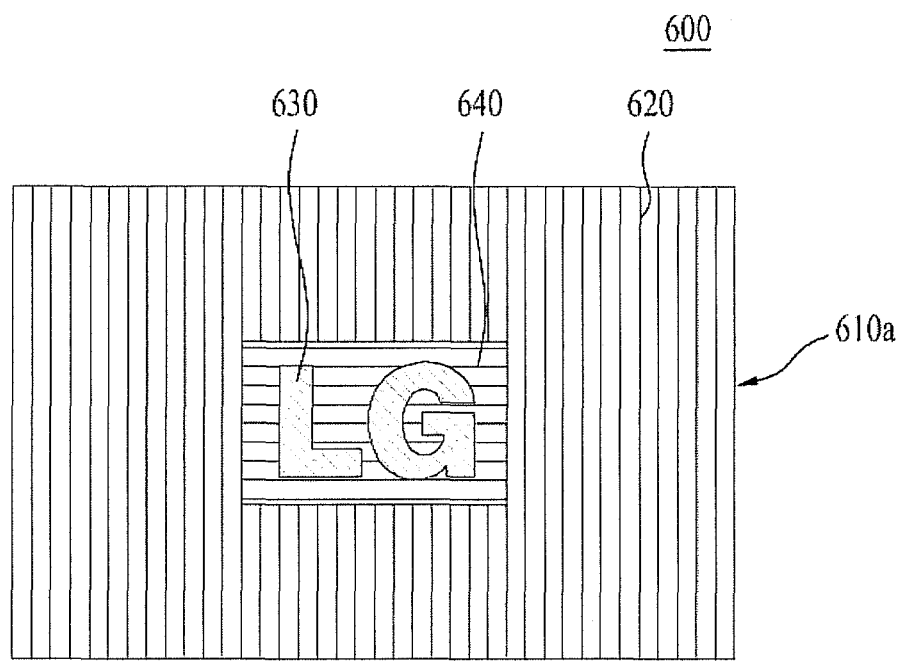
FIGS. 3A and 3B are plan views showing a ground pattern of the optical member of FIG. 1A.
Figure 3B:
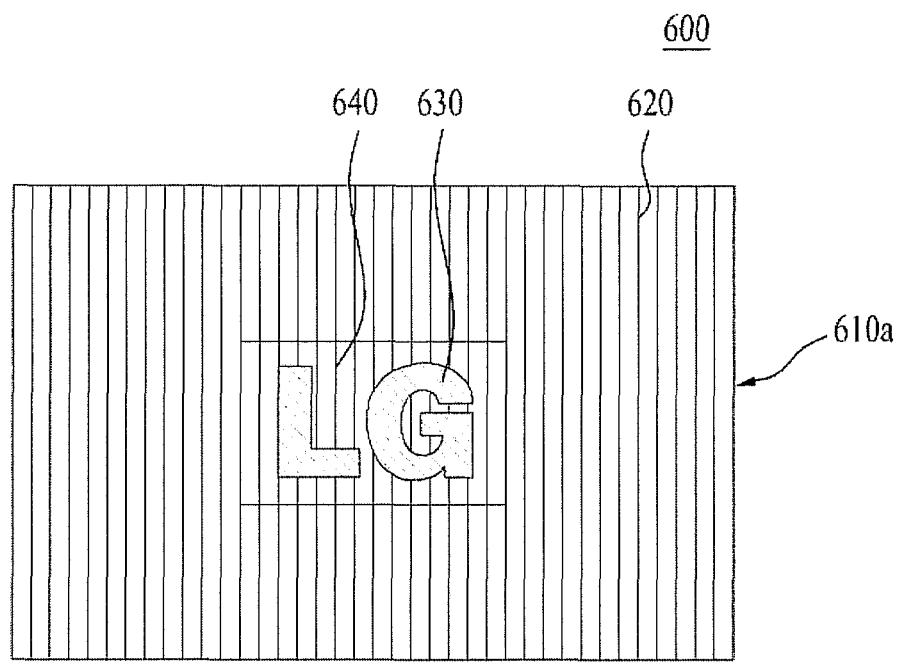

FIGS. 3A and 3B are plan views showing the ground pattern of the optical member of FIG. 1A.

As shown in FIGS. 3A and 3B, the optical member 600 may include a plate 610, a first pattern 630, a second pattern 620, and a ground pattern 640.

The first pattern 630, the second pattern 620, and the ground pattern 640 may be disposed at the top surface 610*a* of the plate 610.

The first pattern 630 may display a predetermined emblem, and the second pattern 620 may condense incident light.

The second pattern 620 may include a plurality of protrusions arranged side by side in a first direction. The protrusions may be formed in a stripe shape.

The ground pattern 640 may be disposed between the first pattern 630 and the second pattern 620 to surround the first pattern 630.

That is, the ground pattern 640 may be disposed around the first pattern 630 to improve visibility of the emblem displayed by the first pattern 630.

The ground pattern 640 may be different from the second pattern 620 as shown in FIG. 3A.

For example, the second pattern 620 may be configured so that a plurality of protrusions formed in a stripe shape is arranged side by side in a first direction, and the ground pattern 640 may be configured so that a plurality of protrusions formed in a stripe shape is arranged side by side in a second direction perpendicular to the first direction.

According to circumstances, the ground pattern 640 may be identical to the second pattern 620.

For example, the second pattern 620 may be configured so that a plurality of protrusions formed in a stripe shape is arranged side by side in a first direction, and the ground pattern 640 may be configured so that a plurality of protrusions formed in a stripe shape is arranged side by side in a second direction identical to the first direction in which the protrusions of the second pattern 620 are arranged.

In a case in which the protrusions of the ground pattern 640 are arranged side by side in the second direction identical to the first direction in which the protrusions of the second pattern 620 are arranged, the intervals between the protrusions of the ground pattern 640 may be narrower or wider than those between the protrusions of the second pattern 620.

The ground pattern 640 is arranged as described above to prevent lowering in vividness of the emblem due to light refracted by the second pattern 620.

For example, in a case in which the vividness of the emblem displayed by the first pattern 630 is lowered due to light refracted by the second pattern 620, the ground pattern 640 may be disposed around the first pattern 630 to improve vividness of the emblem.

A direction in which light is refracted by the ground pattern 640 may be different from that in which light is refracted by the first pattern 630.

According to circumstances, the ground pattern 640 may be omitted from the optical member 600.

In this embodiment, the optical member 600 includes the first pattern, second pattern, and ground pattern, and therefore, it is possible to vividly display the emblem and, at the same time, to condense light, thereby providing high brightness.

In this embodiment, therefore, it is possible to provide a lamp capable of exhibiting high brightness and having excellent advertisement and public information effects.

Figure 4A:
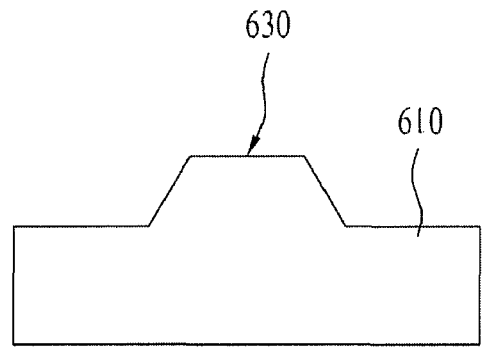
FIGS. 4A to 4C are sectional views showing a first pattern according to a first embodiment.
Figure 4B:
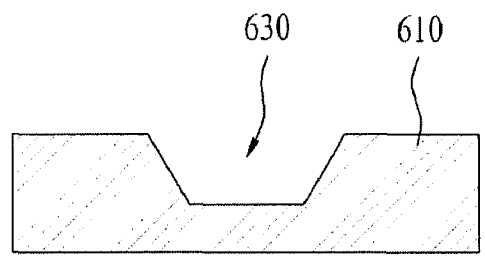
Figure 4C:
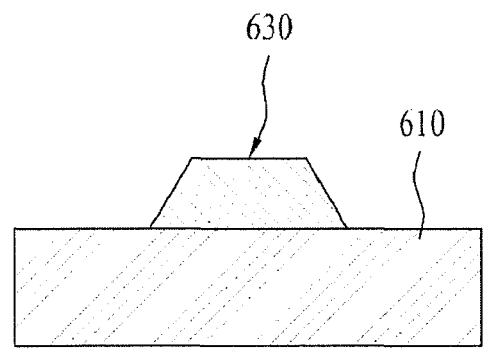

FIGS. 4A to 4C are sectional views showing a first pattern according to a first embodiment.

As shown in FIGS. 4A to 4C, a first pattern 630 may be disposed on the plate 610. The first pattern 630 may display a predetermined emblem.

The first pattern 630 may be at least one selected from among an embossed pattern, an engraved pattern, and a printed pattern.

The embossed pattern may be a pattern protruding from the surface of the plate 610 as the result of processing the surface of the plate 610 as shown in FIG. 4A. The engraved pattern may be a pattern recessed by a predetermined depth from the surface of the plate 610 as the result of processing the surface of the plate 610 as shown in FIG. 4B.

The printed pattern may be a pattern obtained by printing a pattern material on the surface of the plate 610 as shown in FIG. 4C.

For example, the plate 610 may be generally formed of acryl resin. However, embodiments are not limited thereto. In addition, the plate 610 may be formed of a material having a light diffusion function, for example, highly-transmissive plastic, such as polystyrene (PS), polymethyl methacrylate (PMMA), cyclic olefin copolymer (COC), polyethylene terephthalate (PET), or resin.

Consequently, the first pattern 630 may be obtained by mechanically or chemically processing the surface of the plate 610 or using a printing process of printing a pattern material on the plate 610.

In the printing process, the same material as the plate 610 may be used as the pattern material. According to circumstances, a material different from that for the plate 610 may be used as the pattern material.

Figure 5A:
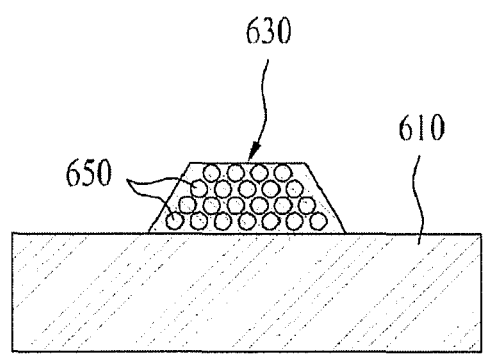
FIGS. 5A and 5B are sectional views showing a first pattern according to a second embodiment.
Figure 5B:
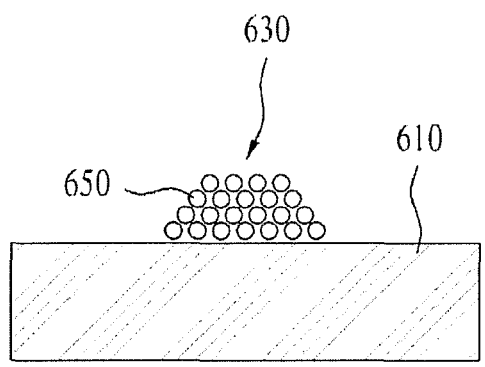

FIGS. 5A and 5B are sectional views showing a first pattern according to a second embodiment.

As shown in FIGS. 5A and 5B, a first pattern 630 may be disposed on the plate 610. The first pattern 630 may display a predetermined emblem.

The first pattern 630 may contain a plurality of fluorescent particles 650.

That is, the first pattern 630 may be a pattern in which the fluorescent particles 650 are stacked as shown in FIG. 5A or a fluorescent layer containing the fluorescent particles 650 as shown in FIG. 5B.

For example, the fluorescent layer may contain a transparent resin and the fluorescent particles 650. A content ratio of the transparent resin to the fluorescent particles may be about 1:1 to 1:3.

The fluorescent particles 650 may have a wavelength of about 550 to 750 nm.

According to circumstances, the fluorescent particles 650 may have a wavelength of about 580 to 600 nm, such as $(Br,Sr,Ca)_2SiO_4:Eu$.

Also, the fluorescent particles 650 may have a wavelength of about 601 to 670 nm, such as $(Ca,Sr,Ba)_2Si_5N_8$:Eu, $(Mg,Ca,Sr)AlSiN_3$:Eu, $(Ca,Sr,Ba)Si_7N_{10}$:Eu, or $(Ca,Sr,Ba)SiN_2$:Eu.

The fluorescent particles 650 may be formed in at least one selected from among polygonal, spherical, or flake shapes.

The fluorescent particles 650 may be formed in a spherical shape having an average particle diameter of about 100 nm to 50 μm.

The reason that the fluorescent particles 650 are contained in the first pattern 630 is that incident light is reflected by the fluorescent particles 650, and therefore, the emblem is vividly displayed even in the daytime.

In this embodiment, therefore, it is possible to improve vividness of the emblem in an environment as bright as the daytime as well as in the nighttime.

Figure 6:
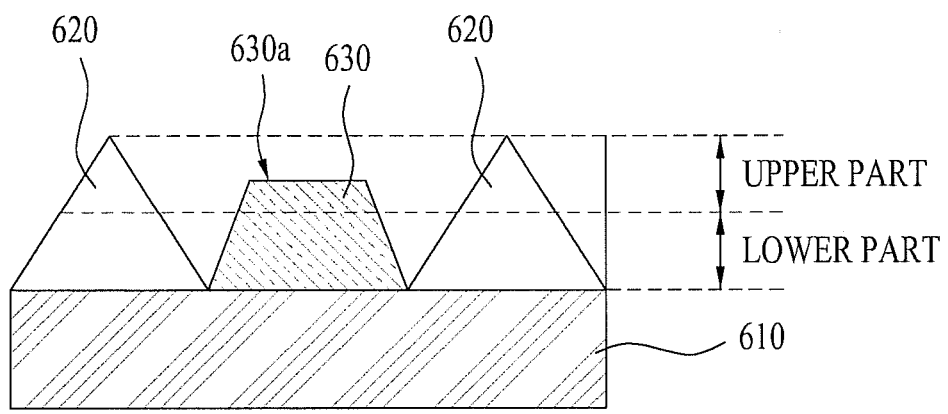
FIG. 6 is a sectional view showing a first pattern according to a third embodiment.

FIG. 6 is a sectional view showing a first pattern according to a third embodiment.

As shown in FIG. 6, a first pattern 630 may be disposed on the plate 610. The first pattern 630 may display a predetermined emblem.

The shape of a lower section of the first pattern 630 may be identical to that of a lower section of the second pattern 620, and the shape of an upper section of the first pattern 630 may be different from that of an upper section of the second pattern 620.

That is, the first pattern 630 may be formed by processing the second pattern 620.

For example, the entire area of the plate 610 may be primarily processed so that the second pattern 620 is disposed on the plate 610, and then a portion of the second pattern 620 may be secondarily processed to form the first pattern 630 capable of displaying the emblem.

As shown in FIG. 6, a portion of the second pattern 620 may be processed to form the first pattern 630 having a flat top surface 630a.

The top surface 630a of the first pattern 630 may be processed so that the first pattern 630 displays the emblem.

In this embodiment, the first pattern 630 capable of displaying the emblem is formed by processing a portion of the second pattern 620. Consequently, the processing may be simplified, and processing time may be reduced.

Figure 7A:
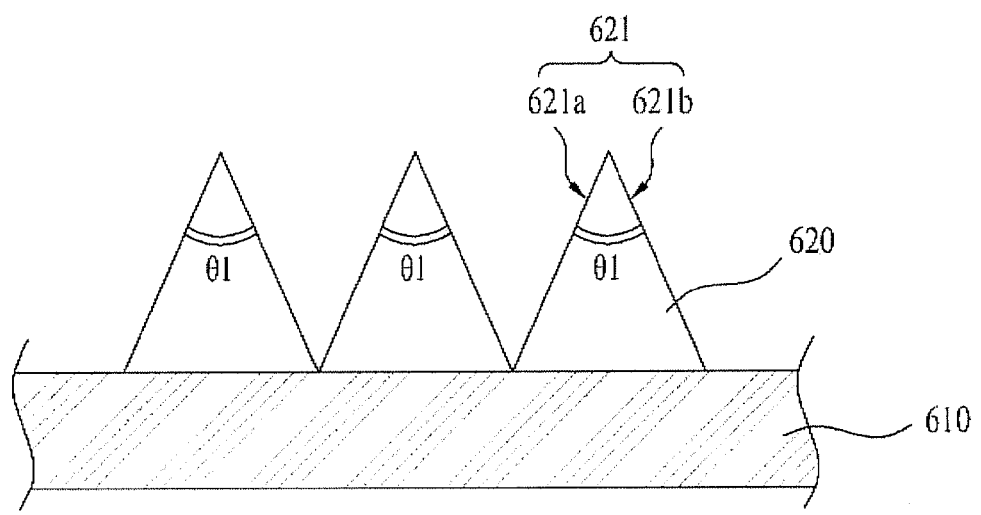
FIGS. 7A to 7C are sectional views showing a second pattern according to a first embodiment.
Figure 7B:
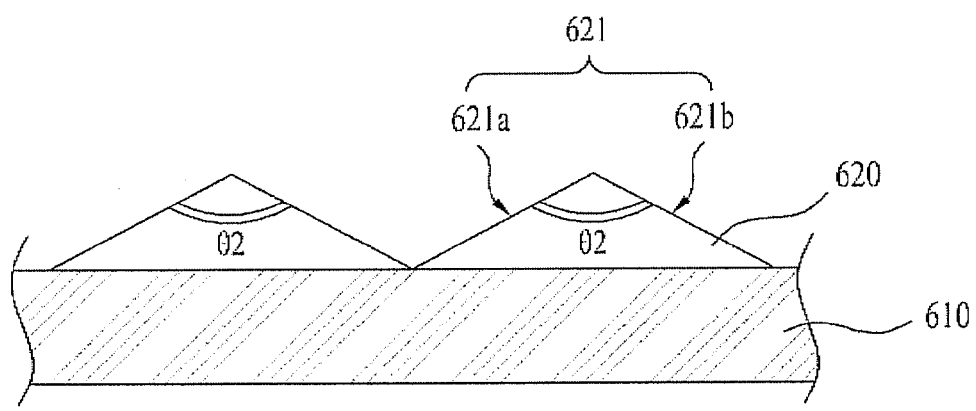
Figure 7C:
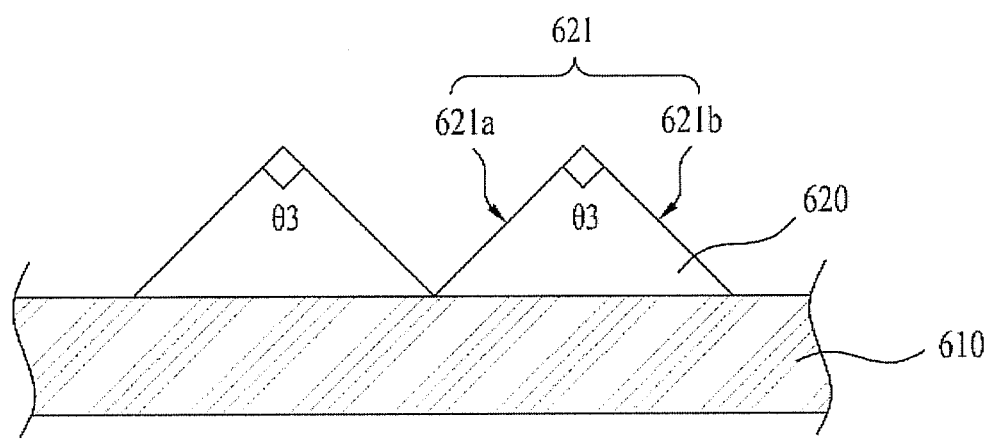

FIGS. 7A to 7C are sectional views showing a second pattern according to a first embodiment.

As shown in FIGS. 7A to 7C, a second pattern 620 may be disposed on the plate 610 to condense incident light.

The second pattern 620 may be a protrusion 621 protruding upward from the top surface of the plate 610.

The vertical section of the protrusion 621 may include a first surface 621a and second surface 621b facing each other. The angle between the first surface 621a and second surface 621b may be about 10 to 170 degrees.

For example, an angle θ1 between the first surface 621a and second surface 621b of the protrusion 621 of the second pattern 620 may be an acute angle as shown in FIG. 7A. According to circumstances, an angle θ2 between the first surface 621a and second surface 621b of the protrusion 621 of the second pattern 620 may be an obtuse angle as shown in FIG. 7B.

In another case, an angle θ3 between the first surface 621a and second surface 621b of the protrusion 621 of the second pattern 620 may be a right angle as shown in FIG. 7C.

The reason that the second pattern 620 has various angles between the first surface 621a and second surface 621b of the protrusion 621 as described above is that light condensation and light diffusion are variously required based on an object, to which the lamp is mounted.

Figure 8:
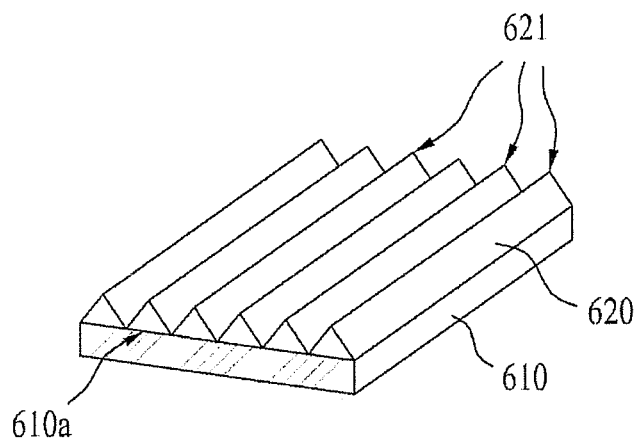
FIG. 8 is a perspective view showing a second pattern according to a second embodiment.

FIG. 8 is a perspective view showing a second pattern according to a second embodiment.

As shown in FIG. 8, a second pattern 620 may be disposed on the plate 610 to condense incident light.

The second pattern 620 may be a protrusion 621 protruding upward from the top surface of the plate 610.

In this embodiment, the second pattern 620 may include a plurality of protrusions 621 arranged side by side in one direction. The protrusions 621 may be formed in a stripe shape.

The protrusions 621 of the second pattern 620 may be successively arranged side by side, and neighboring protrusions 621 may partially contact each other.

The protrusions 621 of the second pattern 620 are successively arranged side by side as described above to provide uniform brightness throughout.

Figure 9A:
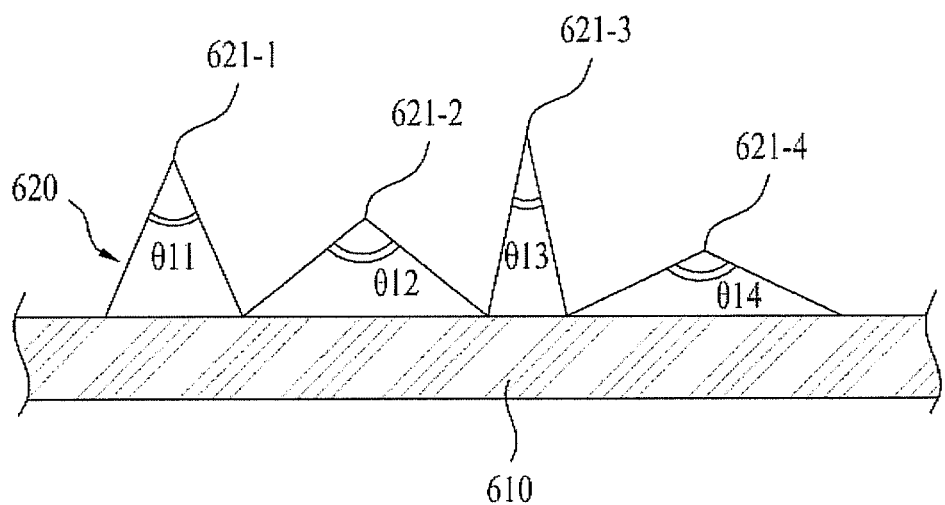
FIGS. 9A and 9B are sectional views showing the size of the second pattern.
Figure 9B:
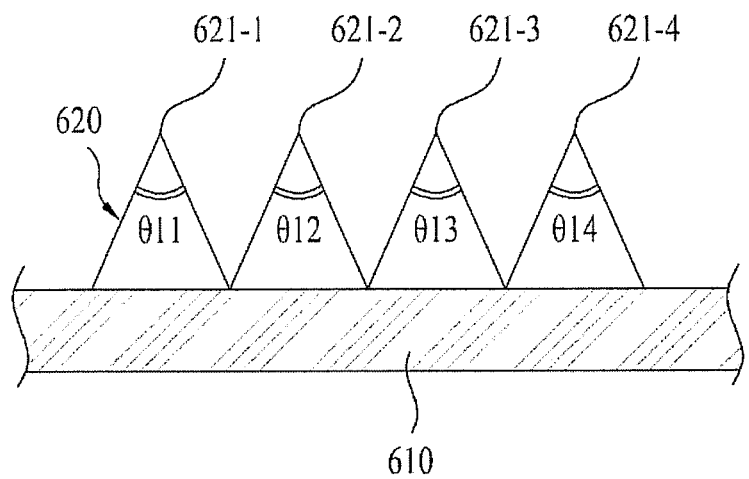

FIGS. 9A and 9B are sectional views showing the size of the second pattern.

As shown in FIGS. 9A and 9B, the second pattern 620 may be disposed on the plate 610 to condense incident light.

The second pattern 620 may be a protrusion protruding upward from the top surface of the plate 610.

The vertical section of the protrusion may include a first surface and second surface facing each other. The angle between the first surface and second surface may be about 10 to 170 degrees.

For example, in a case in which the second pattern 620 includes a first protrusion 621-1, second protrusion 621-2, third protrusion 621-3, and fourth protrusion 621-4, which are successively arranged, angles between the first surface and second surface may be different. According to circumstances, the angles between the first surface and second surface may be the same.

On the assumption that an angle between the first surface and second surface of the first protrusion 621-1 is θ11, an angle between the first surface and second surface of the second protrusion 621-2 is θ12, an angle between the first surface and second surface of the third protrusion 621-3 is θ13, and an angle between the first surface and second surface of the fourth protrusion 621-4 is θ14, θ11, θ12, θ13, and θ14 may be different as shown in FIG. 9A.

According to circumstances, θ11, θ12, θ13, and θ14 may be the same as shown in FIG. 9B.

The second pattern 620 including protrusions 621 having different angles between the first surface and second surface may be properly applied to an object requiring various condensing degrees based on curvature.

Also, the second pattern 620 including protrusions 621 having the same angle between the first surface and second surface may be properly applied to an object requiring uniform brightness and condensing degree.

Consequently, the second pattern 620 of the optical member may be varied based on an object, to which the lamp is mounted.

Figure 10:
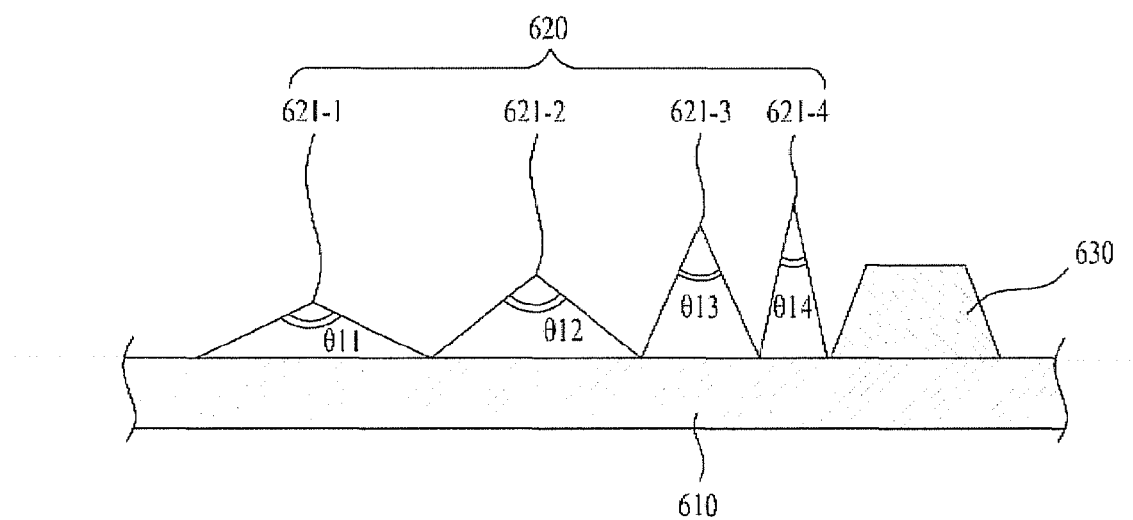
FIG. 10 is a sectional view showing change of a vertical angle of the second pattern based on the position of the first pattern.

FIG. 10 is a sectional view showing change of a vertical angle of the second pattern based on the position of the first pattern.

As shown in FIG. 10, the first pattern 630 and the second pattern 620 may be disposed on the plate 610. The first pattern 630 may display an emblem, and the second pattern 620 may condense incident light.

The second pattern 620 may be a protrusion protruding upward from the top surface of the plate 610.

The vertical section of the protrusion may include a first surface and second surface facing each other. The angle between the first surface and second surface may be about 10 to 170 degrees.

For example, in a case in which the second pattern 620 includes a first protrusion 621-1, second protrusion 621-2, third protrusion 621-3, and fourth protrusion 621-4, which are successively arranged, the angles between the first surface and second surface of the first protrusion 621-1, second protrusion 621-2, third protrusion 621-3, and fourth protrusion 621-4 may be gradually decreased toward the first pattern 630.

That is, in a case in which the first protrusion 621-1 is most distant from the first pattern 630, the fourth protrusion 621-4 is closest to the first pattern 630, and the second protrusion 621-2 and the third protrusion 621-3 are sequentially disposed between the first protrusion 621-1 and the fourth protrusion 621-4, as shown in FIG. 10, the angle θ11 between the first surface and second surface of the first protrusion 621-1 may be largest, and the angle θ14 between the first surface and second surface of the fourth protrusion 621-4 may be smallest.

As described above, the second pattern 620 may include protrusions 621 having different vertical angles. The vertical angles of the protrusions 621 may be gradually decreased toward the first pattern 630.

As a result, a condensing degree of light incident upon the circumference of the first pattern 630 to display the emblem is increased, thereby improving vividness of the emblem.

Figure 11A:
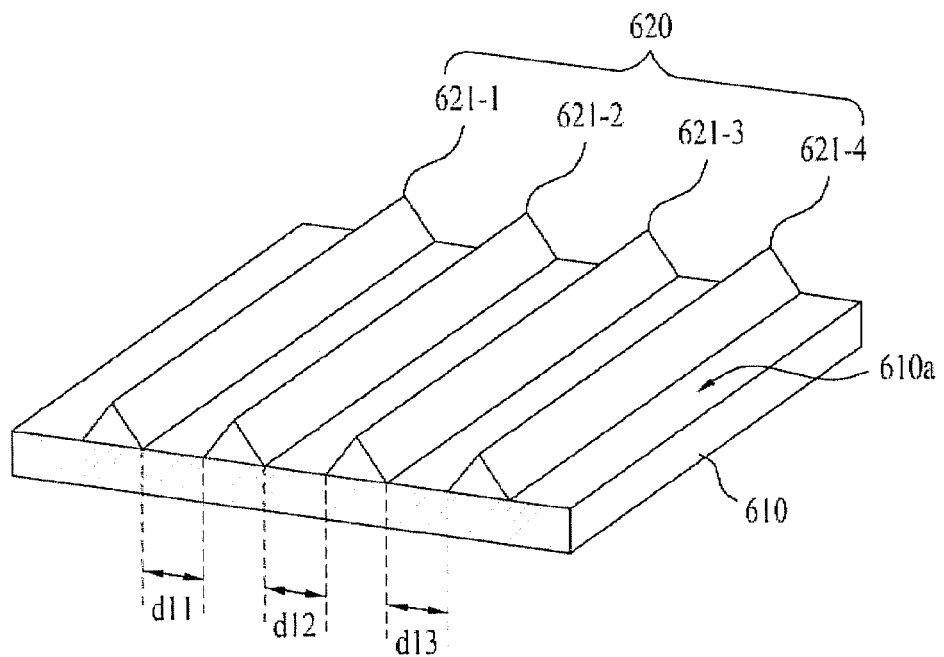
FIGS. 11A and 11B are perspective views showing a second pattern according to a third embodiment.
Figure 11B:
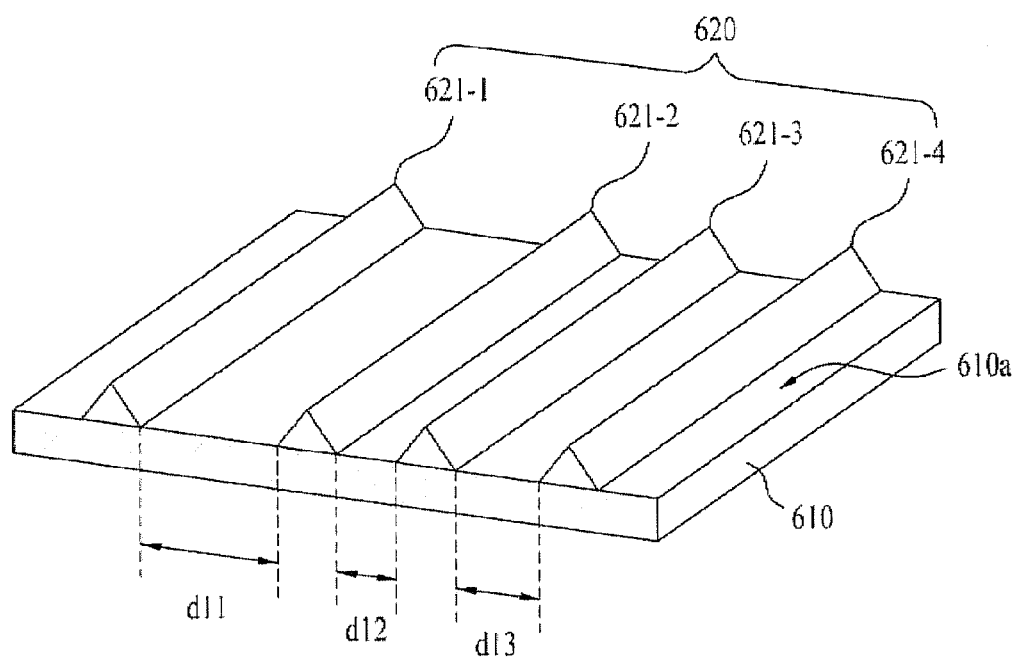

FIGS. 11A and 11B are perspective views showing a second pattern according to a third embodiment.

As shown in FIGS. 11A and 11B, a second pattern 620 may be disposed on the plate 610 to condense incident light.

The second pattern 620 may be a protrusion 621 protruding upward from the top surface of the plate 610.

In this embodiment, the second pattern 620 may include a plurality of protrusions 621 arranged side by side in one direction. The protrusions 621 may be formed in a stripe shape.

The protrusions 621 of the second pattern 620 may be arranged side by side at predetermined intervals.

That is, neighboring protrusions 621 may be spaced apart from each other by a predetermined distance. The neighboring protrusions 621 may be spaced apart from each other by the same distance. According to circumstances, the neighboring protrusions 621 may be spaced apart from each other by different distances.

For example, in a case in which the second pattern 620 includes a first protrusion 621-1, second protrusion 621-2, third protrusion 621-3, and fourth protrusion 621-4, which are successively arranged, the first protrusion 621-1 and the second protrusion 621-2 may be spaced apart from each other by a distance d11, the second protrusion 621-2 and the third protrusion 621-3 may be spaced apart from each other by a distance d12, the third protrusion 621-3 and the fourth protrusion 621-4 may be spaced apart from each other by a distance d13.

As shown in FIG. 11A, the distance d11, distance d12, distance d13 may be the same. As shown in FIG. 11B, the distance d11, distance d12, and distance d13 may be different.

Consequently, the second pattern 620 of the optical member may be varied based on an object, to which the lamp is mounted.

Figure 12:
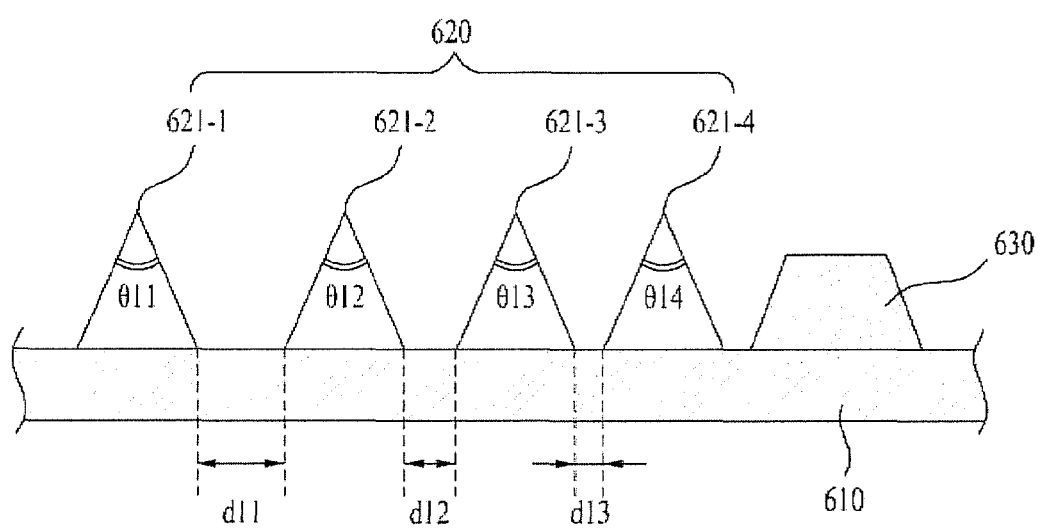
FIG. 12 is a sectional view showing distance change between protrusions of the second patterns based on the position of the first pattern.

FIG. 12 is a sectional view showing distance change between the protrusions of the second patterns based on the position of the first pattern.

As shown in FIG. 12, the first pattern 630 and the second pattern 620 may be disposed on the plate 610. The first pattern 630 may display an emblem, and the second pattern 620 may condense incident light.

The second pattern 620 may include protrusions protruding upward from the top surface of the plate 610.

The protrusions of the second pattern 620 may be arranged side by side at predetermined intervals.

For example, in a case in which the second pattern 620 includes a first protrusion 621-1, second protrusion 621-2, third protrusion 621-3, and fourth protrusion 621-4, which are successively arranged, the first protrusion 621-1 and the second protrusion 621-2 may be spaced apart from each other by a distance d11, the second protrusion 621-2 and the third protrusion 621-3 may be spaced apart from each other by a distance d12, the third protrusion 621-3 and the fourth protrusion 621-4 may be spaced apart from each other by a distance d13.

In a case in which the first protrusion 621-1 is most distant from the first pattern 630, the fourth protrusion 621-4 is closest to the first pattern 630, and the second protrusion 621-2 and the third protrusion 621-3 are sequentially disposed between the first protrusion 621-1 and the fourth protrusion 621-4, the distance d11 between the first protrusion 621-1 and the second protrusion 621-2 may be largest, and the distance d13 between the third protrusion 621-3 and the fourth protrusion 621-4 may be smallest.

As described above, the second pattern 620 may include protrusions 621 having different intervals therebetween. The intervals between the protrusions 621 may be gradually decreased toward the first pattern 630.

As a result, a condensing degree of light incident upon the circumference of the first pattern 630 to display the emblem is increased, thereby improving vividness of the emblem.

Figure 13A:
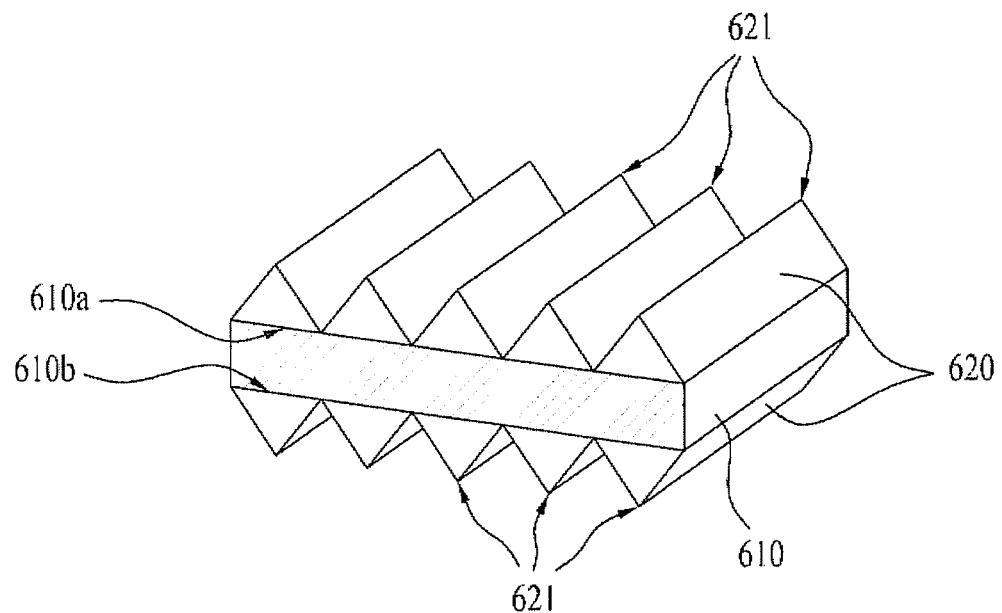
FIGS. 13A and 13B are perspective views showing a second pattern according to a fourth embodiment.
Figure 13B:
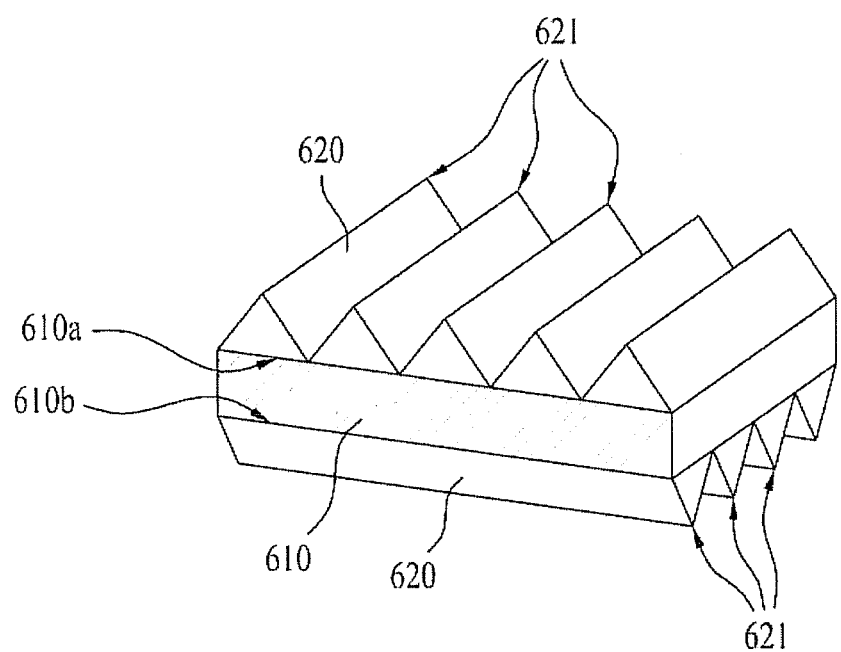

FIGS. 13A and 13B are perspective views showing a second pattern according to a fourth embodiment.

As shown in FIGS. 13A and 13B, a second pattern 620 may be disposed on the plate 610 to condense incident light.

The second pattern 620 may be a protrusion 621 protruding upward from the top surface of the plate 610.

In this embodiment, the second pattern 620 may include a plurality of protrusions 621 arranged side by side in one direction. The protrusions 621 may be formed in a stripe shape.

Protrusions 621 of the second pattern 620 disposed at the top surface 610a of the plate 610 may be identical to protrusions 621 of the second pattern 620 disposed at the bottom surface 610b of the plate 610.

For example, in a case in which the protrusions 621 of the second pattern 620 disposed at the top surface 610a of the plate 610 are arranged side by side in a first direction as shown in FIG. 13A, the protrusions 621 of the second pattern 620 disposed at the bottom surface 610b of the plate 610 may be arranged side by side in the first direction.

On the other hand, in a case in which the protrusions 621 of the second pattern 620 disposed at the top surface 610a of the plate 610 are arranged side by side in a first direction as shown in FIG. 13B, the protrusions 621 of the second pattern 620 disposed at the bottom surface 610b of the plate 610 may be arranged side by side in a second direction perpendicular to the first direction.

Consequently, the second pattern 620 of the optical member may be varied based on an object, to which the lamp is mounted.

Figure 14:
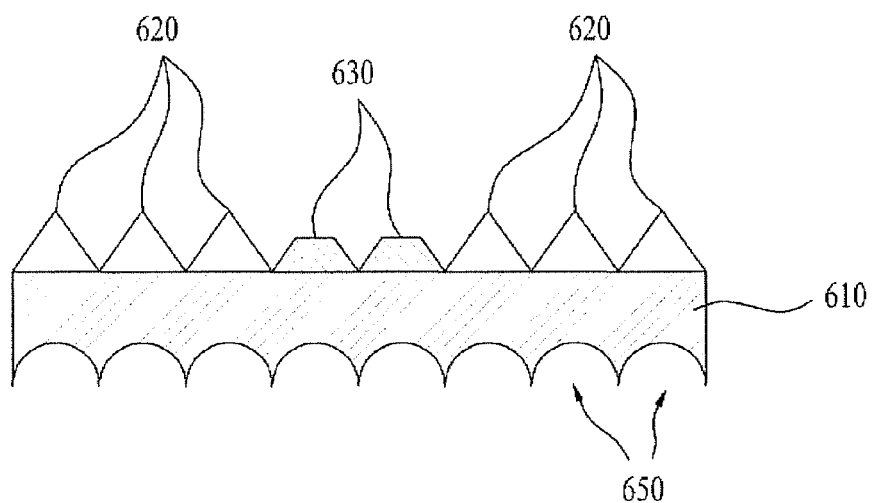
FIG. 14 is a sectional view showing a third pattern.

FIG. 14 is a sectional view showing a third pattern.

As shown in FIG. 14, the optical member may be configured so that a first pattern 630 and a second pattern 620 are disposed at the top surface of the plate 610, and a third pattern 650 is disposed at the bottom surface of the plate 610.

The first pattern 630 may display an emblem, the second pattern 620 may condense incident light, and the third pattern 650 may diffuse incident light.

The third pattern 650 may be a groove disposed at the bottom surface of the plate 610. The groove may be concave in vertical section. However, embodiments are not limited thereto.

In the optical member, the third pattern for light diffusion is disposed at the bottom surface of the plate 610, and therefore, additional sheets for light diffusion are removed. Consequently, cost of the lamp is reduced, and the total weight of the lamp is reduced.

Figure 15:
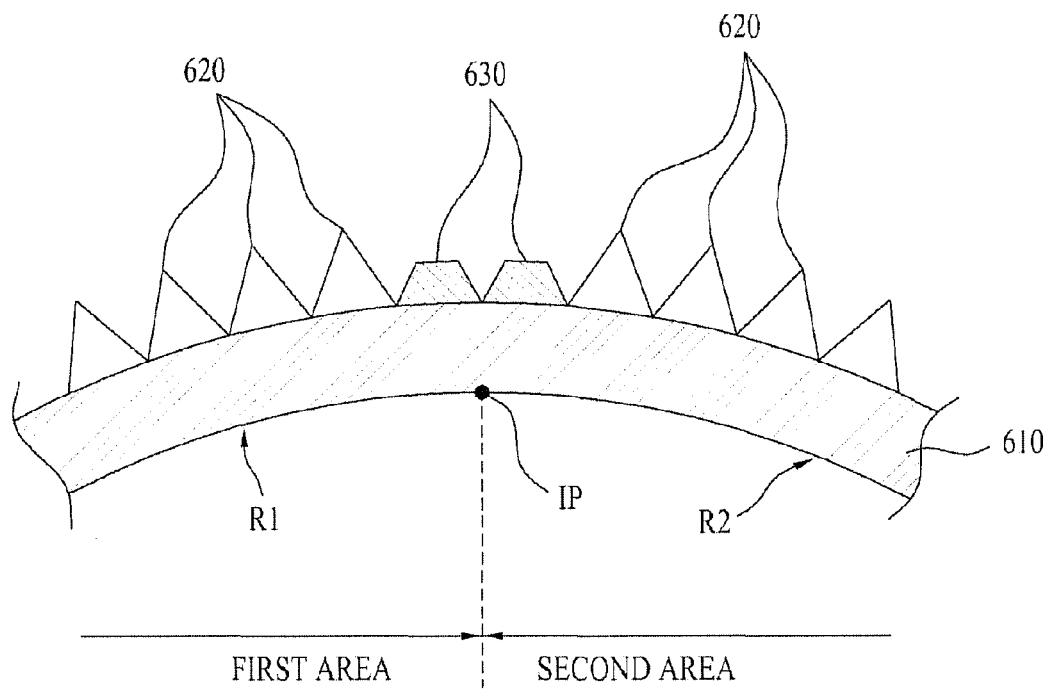
FIG. 15 is a sectional view showing an optical member having a curved surface.

FIG. 15 is a sectional view showing an optical member having a curved surface.

As shown in FIG. 15, the optical member is configured so that the first pattern 630 and the second pattern 620 are disposed at the top surface of the plate 610. The first pattern 630 may display an emblem, and the second pattern 620 may condense incident light.

The plate 610 may include at least two inclined surfaces having at least one inflection point IP.

For example, the plate 610 may be divided into a first area and second area on the basis of the inflection point IP.

The inclined surface of the first area of the plate 610 may have a first radius of curvature, and the inclined surface of the second area of the plate 610 may have a second radius of curvature. The first radius of curvature may be different from the second radius of curvature.

According to circumstances, the plate 610 may have a plurality of inflection points IP, and the inclined surfaces adjacent to each other on the basis of each inflection point IP may have different radii of curvature.

The optical member including the plate 610 that can be curved as described above may be applied to an object having curvature.

Consequently, it is possible to improve economy of the lamp and a degree of freedom in product design.

FIGS. 16A to 16D are sectional views showing supporting portions of a substrate.

As shown in FIGS. 16A to 16D, a light source module may include a substrate 100b and a plurality of light sources 100a arranged on the substrate 100b.

The substrate 100b may include a plurality of supporting portions 120 and a plurality of connecting portions 130. The supporting portions 120 may be disposed so as to correspond to the respective light sources 100a, and the connecting portions 130 may be disposed between neighboring supporting portions 120.

Figure 16A:
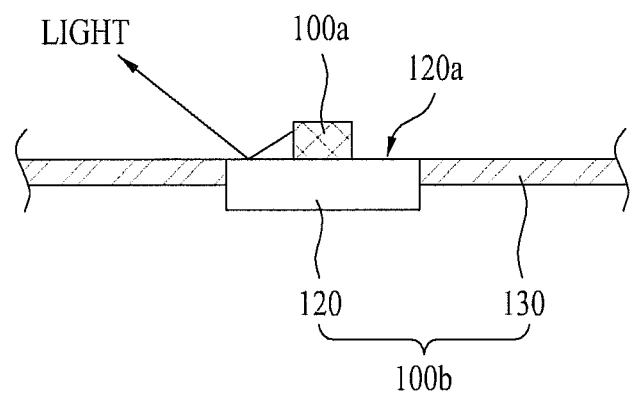
FIGS. 16A to 16D are sectional views showing supporting portions of a substrate of FIG. 1A.

As shown in FIG. 16A, a surface 120a of each supporting portion 120 opposite a corresponding one of the light sources 100a may be a flat surface.

Figure 16B:
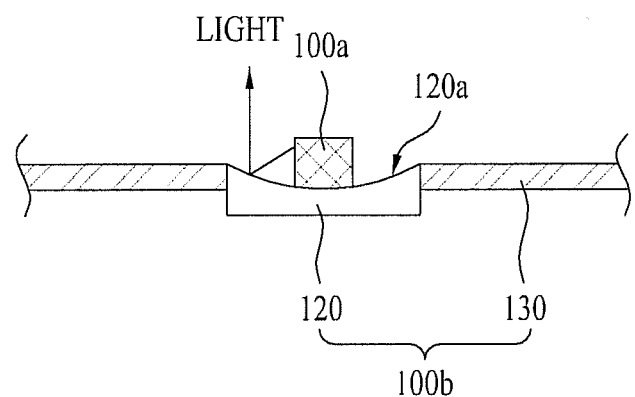
Figure 16C:
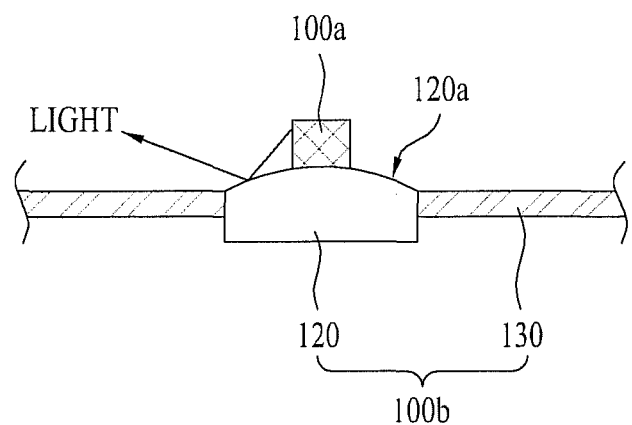

According to circumstances, as shown in FIG. 16B, the surface 120a of each supporting portion 120 opposite a corresponding one of the light sources 100a may be a concave surface. Also, as shown in FIG. 16C, the surface 120a of each supporting portion 120 opposite a corresponding one of the light sources 100a may be a convex surface.

Figure 16D:
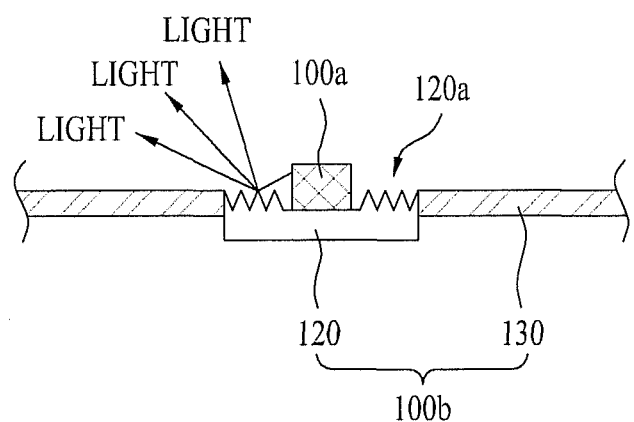

In another case, as shown in FIG. 16D, the surface 120a of each supporting portion 120 opposite a corresponding one of the light sources 100a may be a surface having an uneven pattern.

Also, a reflective coating film or reflective coating material layer may be formed at each supporting portion 120 of the substrate 150 to reflect light generated by the light sources 100a toward the optical member 600.

The reflective coating film or reflective coating material layer may contain a metal, such as chrome (Cr), aluminum (Al), silver (Ag), or gold (Au), exhibiting high reflectance or a metal oxide, such as titanium oxide ($TiO_2$), exhibiting high reflectance.

As described above, the shape of the surface of each supporting portion 120 of the substrate 100b may be variously changed based on a design condition of the light source module required by an object, to which the light source module is mounted, to provide uniform brightness throughout.

FIGS. 17A to 17D are sectional views showing connecting portions of a substrate.

As shown in FIGS. 17A to 17D, a light source module may include a substrate 100b and a plurality of light sources 100a arranged on the substrate 100b.

The substrate 100b may include a plurality of supporting portions 120 and a plurality of connecting portions 130. The supporting portions 120 may be disposed so as to correspond to the respective light sources 100a, and the connecting portions 130 may be disposed between neighboring supporting portions 120.

Figure 17A:
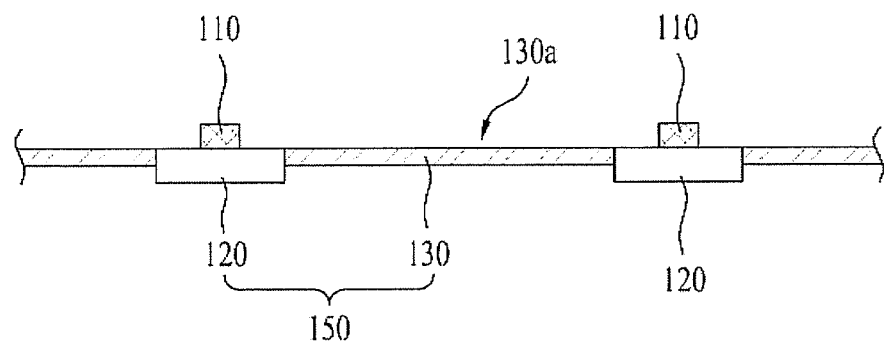
FIGS. 17A to 17D are sectional views showing connecting portions of the substrate of FIG. 1A.

As shown in FIG. 17A, a surface 130a of each connecting portion 130 disposed between neighboring supporting portions 120 may be a flat surface.

Figure 17B:
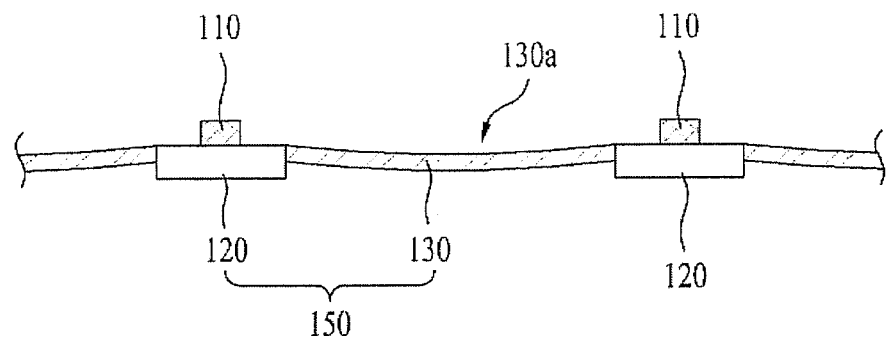
Figure 17C:
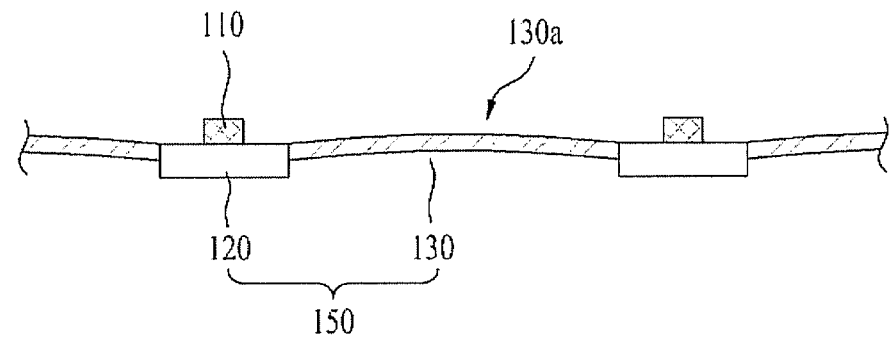

According to circumstances, as shown in FIG. 17B, the surface 130a of each connecting portion 130 disposed between neighboring supporting portions 120 may be a concave surface. Also, as shown in FIG. 17C, the surface 130a of each connecting portion 130 disposed between neighboring supporting portions 120 may be a convex surface.

Figure 17D:
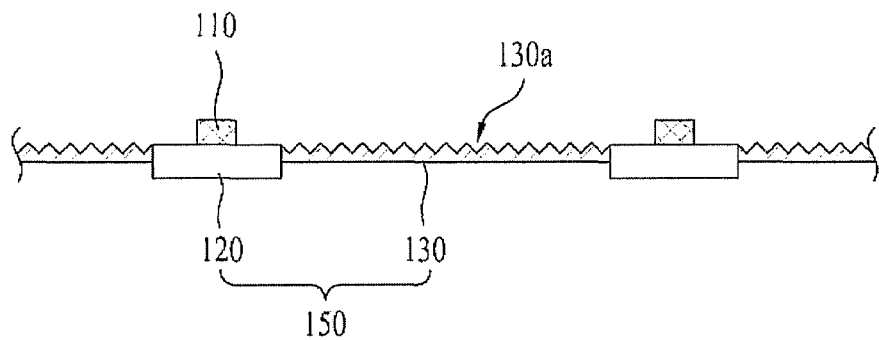

In another case, as shown in FIG. 17D, the surface 130a of each connecting portion 130 disposed between neighboring supporting portions 120 may be a surface having an uneven pattern.

Also, a reflective coating film or reflective coating material layer may be formed at each connecting portion 130 of the substrate 150 to reflect light generated by the light sources 100a toward the optical member 600.

The reflective coating film or reflective coating material layer may contain a metal, such as chrome (Cr), aluminum (Al), silver (Ag), or gold (Au), exhibiting high reflectance or a metal oxide, such as titanium oxide ($TiO_2$), exhibiting high reflectance.

As described above, the shape of the surface of each connecting portion 130 of the substrate 100b may be variously changed based on a design condition of the light source module required by an object, to which the light source module is mounted, to provide uniform brightness throughout.

Figure 18A:
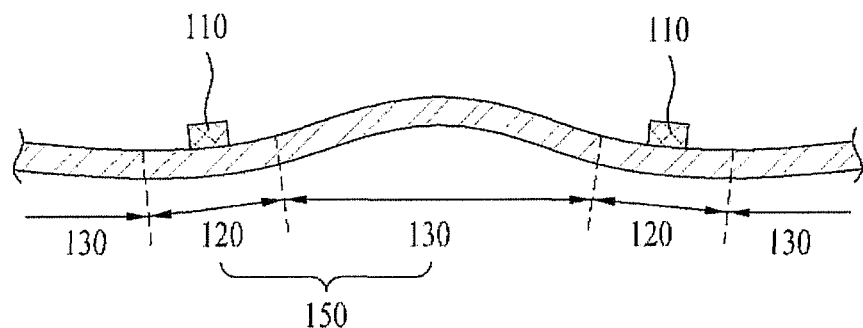
FIGS. 18A and 18B are sectional views showing types of connection between supporting portions and connecting portions of a substrate.
Figure 18B:
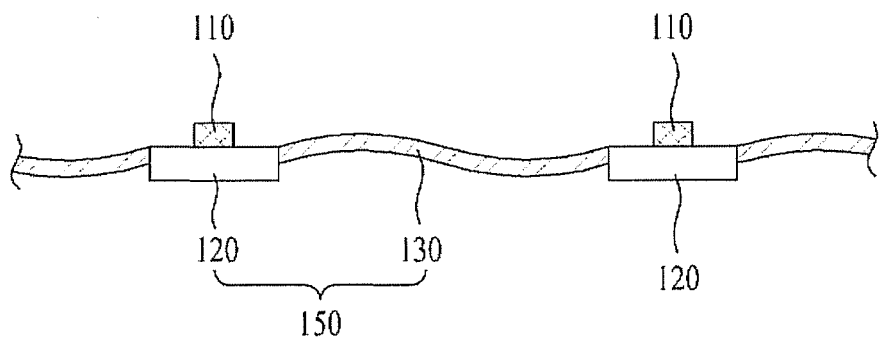

FIGS. 18A and 18B are sectional views showing types of connection between supporting portions and connecting portions of a substrate. FIG. 18A shows an integration type substrate in which supporting portions and connecting portions are integrated, and FIG. 18B shows a separation type substrate in which supporting portions and connecting portions are separated.

As shown in FIGS. 18A and 18B, a light source module may include a substrate 100b and a plurality of light sources 100a arranged on the substrate 100b.

The substrate 100b may include a plurality of supporting portions 120 and a plurality of connecting portions 130. The supporting portions 120 may be disposed so as to correspond to the respective light sources 100a, and the connecting portions 130 may be disposed between neighboring supporting portions 120.

As shown in FIG. 18A, the substrate 100b may be configured of an integrated type in which the supporting portions 120 of the substrate 150 and the connecting portions 130 of the substrate 100b are formed of the same material.

As an example, the supporting portions 120 and the connecting portions 130 of the substrate 100b may each include a base member and a circuit pattern disposed on at least one surface of the base member. The base member may be formed of a film, such as polyimide or epoxy (for example, FR-4), exhibiting flexibility and insulativity.

Also, the supporting portions 120 and the connecting portions 130 of the substrate 100b may be formed of a soft material which is flexible. Consequently, the substrate 100b may be manufactured so as to be applied to an object having curvature.

On the other hand, as shown in FIG. 18B, the substrate 100b may be configured of a separation type in which the supporting portions 120 of the substrate 100b and the connecting portions 130 of the substrate 100b are formed of different materials.

As an example, the supporting portions 120 of the substrate 100b may be conductors, and the connecting portions 130 of the substrate 100b may be nonconductors.

Also, the supporting portions 120 of the substrate 100b may be formed of a hard material which is not flexible to support the respective light sources 100a, and the connecting portions 130 of the substrate 100b may be formed of a soft material which is flexible. Consequently, the substrate 100b may be manufactured so as to be applied to an object having curvature.

In the separation type substrate 100b, coupling members (not shown) may be disposed respectively between the supporting portions 120 and the connecting portions 130 to electrically interconnect the supporting portions 120 and the connecting portions 130.

A reflective coating film or reflective coating material layer may be formed at the supporting portions 120 and the connecting portions 130 of the integration or separation type substrate 100b to reflect light generated by the light sources 100a toward the optical member 600.

The reflective coating film or reflective coating material layer may contain a metal, such as chrome (Cr), aluminum (Al), silver (Ag), or gold (Au), exhibiting high reflectance or a metal oxide, such as titanium oxide ($TiO_2$), exhibiting high reflectance.

Conductive patterns to apply current to drive the light sources 100a may be disposed at the supporting portions 120 and the connecting portions 130 of the substrate 100b.

As an example, the conductive patterns may be disposed at the entire area of the substrate 100b including the supporting portions 120 and the connecting portions 130 or only at the supporting portions 120 of the substrate 100b supporting the light sources 100a.

According to circumstances, the conductive patterns may be disposed only at the connecting portions 130 of the substrate 100b interconnecting neighboring supporting portions 120 to electrically interconnect neighboring light sources 100a.

As described above, the type of connection between the supporting portions 120 and the connecting portions 130 of the substrate 100b may be variously changed based on a design condition of the light source module required by an object, to which the light source module is mounted, to provide uniform brightness throughout.

Figure 19A:
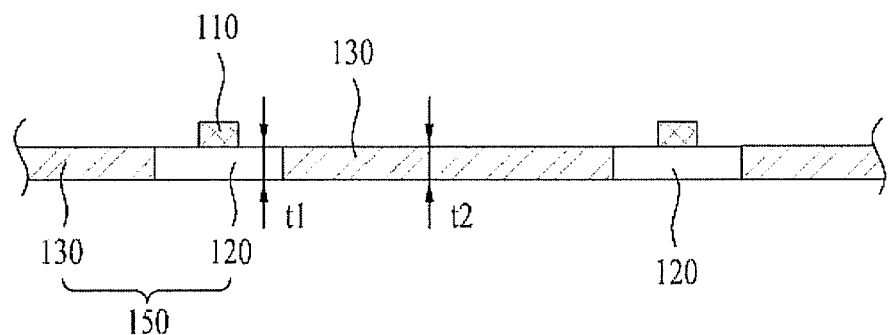
FIGS. 19A to 19C are sectional views showing thicknesses of supporting portions and connecting portions of a substrate.
Figure 19B:
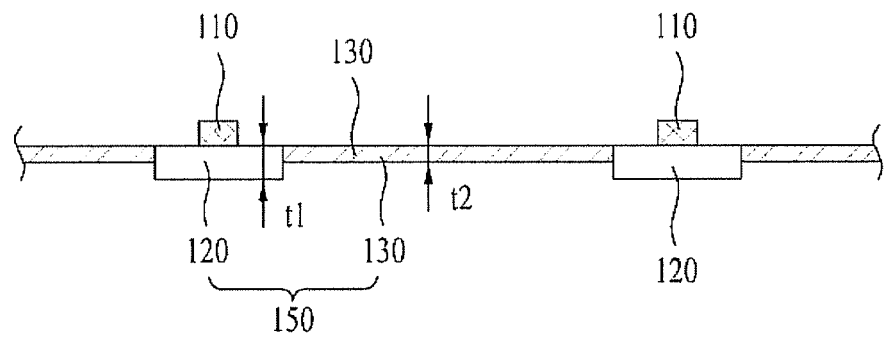
Figure 19C:
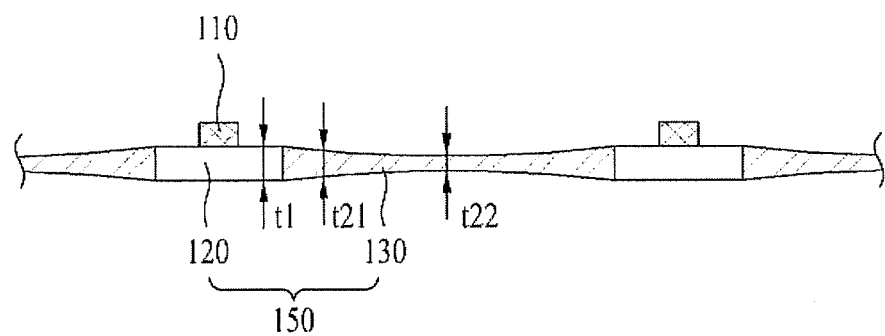

FIGS. 19A to 19C are sectional views showing thicknesses of supporting portions and connecting portions of a substrate.

As shown in FIGS. 19A to 19C, a light source module may include a substrate 100b and a plurality of light sources 100a arranged on the substrate 100b.

The substrate 100b may include a plurality of supporting portions 120 and a plurality of connecting portions 130. The supporting portions 120 may be disposed so as to correspond to the respective light sources 100a, and the connecting portions 130 may be disposed between neighboring supporting portions 120.

As shown in FIG. 19A, the supporting portions 120 of the substrate 100b may have a first thickness t1, the connecting portions 130 of the substrate 100b may have a second thickness t2, and the first thickness t1 and the second thickness t2 may be equal to each other.

According to circumstances, as shown in FIG. 19B, the supporting portions 120 of the substrate 100b may have a first thickness t1, the connecting portions 130 of the substrate 100b may have a second thickness t2, and the first thickness t1 and the second thickness t2 may be different from each other.

The first thickness t1 may be greater than the second thickness t2. As an example, a ratio of the first thickness t1 to the second thickness t2 may be about 1.1:1 to 30:1.

The second thickness t2 is less than the first thickness t1 so that the substrate 100b can be easily curved.

In another case, as shown in FIG. 19C, a thickness t22 of each connecting portion 130 of the substrate 100b at an area distant from a corresponding one of the supporting portions 120 of the substrate 100b may be less than a thickness t21 of each connecting portion 130 of the substrate 100b at an area adjacent to a corresponding one of the supporting portions 120 of the substrate 100b.

That is, each connecting portion 130 of the substrate 100b may be gradually thinned from an area adjacent to a corresponding one of the supporting portions 120 of the substrate 100b to an area distant from a corresponding one of the supporting portions 120 of the substrate 100b.

The thickness of each connecting portion 130 of the substrate 100b is gradually decreased so that the substrate 100b can be easily curved.

As described above, the thicknesses of the supporting portions 120 and the connecting portions 130 of the substrate 100b may be variously changed based on a design condition of the light source module required by an object, to which the light source module is mounted, to provide uniform brightness throughout.

Figure 20:
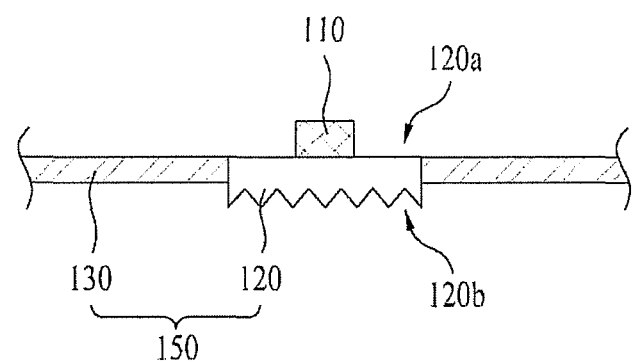
FIG. 20 is a sectional view showing the surface of a supporting portion of a substrate.

FIG. 20 is a sectional view showing the surface of a supporting portion of a substrate.

As shown in FIG. 20, a light source module may include a substrate 100b and a plurality of light sources 100a arranged on the substrate 100b.

The substrate 100b may include a plurality of supporting portions 120 and a plurality of connecting portions 130. The supporting portions 120 may be disposed so as to correspond to the respective light sources 100a, and the connecting portions 130 may be disposed between neighboring supporting portions 120.

Each supporting portion 120 of the substrate 100b may include a first surface 120a opposite a corresponding one of the light sources 110 and a second surface 120b opposite to the first surface 120a. The first surface 120a may be a flat surface, and the second surface 120b may have an uneven pattern.

The first surface 120a of each supporting portion 120 is flat to reflect light generated from a corresponding one of the light sources 100a upward to improve brightness.

Also, the uneven pattern is formed at the second surface 120b of each supporting portion 120 to easily dissipate heat generated from a corresponding one of the light sources 100a.

As described above, the surface of each supporting portion 120 of the substrate 100b may be variously changed based on a design condition of the light source module required by an object, to which the light source module is mounted, to provide uniform brightness throughout.

Figure 21:
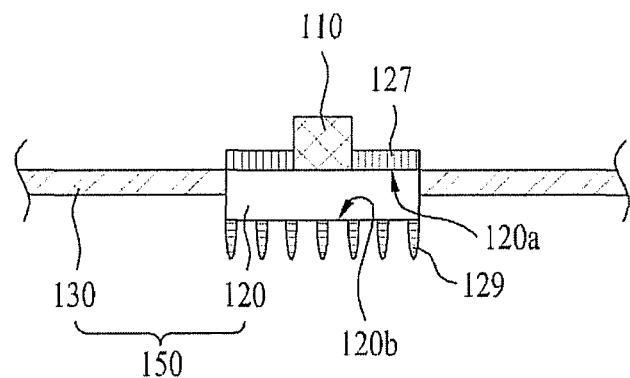
FIG. 21 is a sectional view showing a reflector and heat dissipation pins of a supporting portion of a substrate.

FIG. 21 is a sectional view showing a reflector and heat dissipation pins of a supporting portion of a substrate.

As shown in FIG. 21, a light source module may include a substrate 100b and a plurality of light sources 100a arranged on the substrate 100b.

The substrate 100b may include a plurality of supporting portions 120 and a plurality of connecting portions 130. The supporting portions 120 may be disposed so as to correspond to the respective light sources 100a, and the connecting portions 130 may be disposed between neighboring supporting portions 120.

Each supporting portion 120 of the substrate 100b may include a first surface 120a opposite a corresponding one of the light sources 100a and a second surface 120b opposite to the first surface 120a. A reflector 127 may be disposed on the first surface 120a, and a plurality of heat dissipation pins 129 may be disposed on the second surface 120b.

The reflector 127 may contain a metal, such as chrome (Cr), aluminum (Al), silver (Ag), or gold (Au), exhibiting high reflectance or a metal oxide, such as titanium oxide ($TiO_2$), exhibiting high reflectance The heat dissipation pins 129 may be formed of a material exhibiting high thermal conductivity, such as aluminum, an aluminum alloy, copper, or a copper alloy.

The reflector 127 is formed at the first surface 120a of each supporting portion 120 to reflect light generated from a corresponding one of the light sources 100a upward to improve brightness.

Also, the heat dissipation pins 129 are formed at the second surface 120b of each supporting portion 120 to easily dissipate heat generated from a corresponding one of the light sources 100a.

As described above, the reflector 127 and the heat dissipation pins 129 of each supporting portion 120 of the substrate 100b may be variously changed based on a design condition of the light source module required by an object, to which the light source module is mounted, to provide uniform brightness throughout.

Figure 22A:
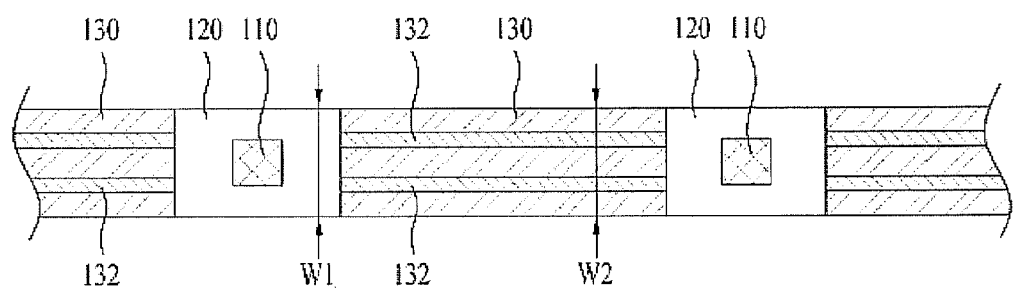
FIGS. 22A and 22B are plan views showing widths of connecting portions of a substrate.
Figure 22B:
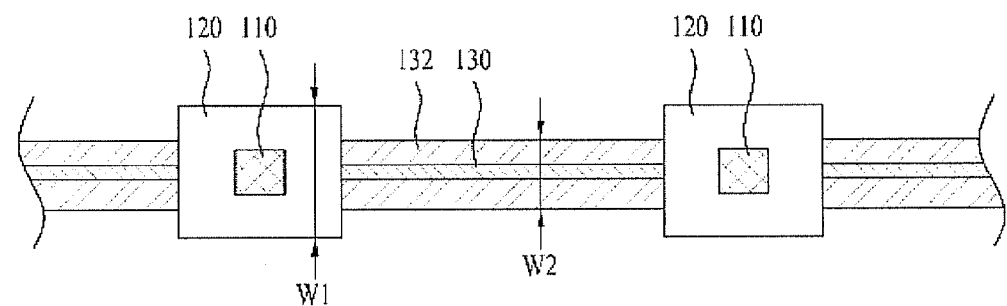

FIGS. 22A and 22B are plan views showing widths of connecting portions of a substrate.

As shown in FIGS. 22A and 22B, a light source module may include a substrate 100b and a plurality of light sources 100a arranged on the substrate 100b.

The substrate 100b may include a plurality of supporting portions 120 and a plurality of connecting portions 130. The supporting portions 120 may be disposed so as to correspond to the respective light sources 100a, and the connecting portions 130 may be disposed between neighboring supporting portions 120.

Conductive patterns 132 to electrically interconnect neighboring light sources 100a may be disposed at each connecting portion 130 of the substrate 100b.

As shown in FIG. 22A, a width W2 of each connecting portion 130 of the substrate 100b may be equal to a width W1 of each supporting portion 120 of the substrate 100b.

In a case in which the width W2 of each connecting portion 130 of the substrate 100b is equal to the width W1 of each supporting portion 120 of the substrate 100b, it is possible to secure a free space in which the conductive patterns 132 can be designed in various forms.

On the other hand, as shown in FIG. 22B, the width W2 of each connecting portion 130 of the substrate 100b may be less than the width W1 of each supporting portion 120 of the substrate 100b.

In a case in which the width W2 of each connecting portion 130 of the substrate 100b is less than the width W1 of each supporting portion 120 of the substrate 100b, the substrate 100b can be easily curved so that the substrate 100b can be applied to an object having curvature.

As described above, the width of each connecting portion 130 of the substrate 100b may be variously changed based on a design condition of the light source module required by an object, to which the light source module is mounted, to provide uniform brightness throughout.

Figure 23:
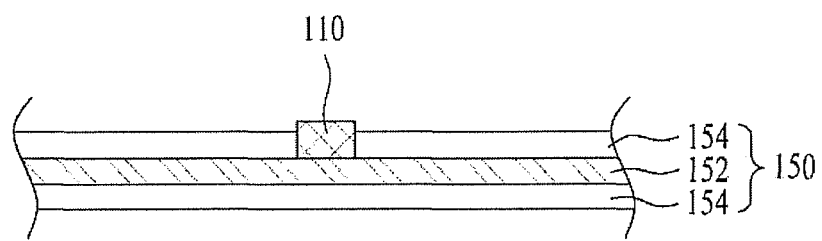
FIG. 23 is a sectional view showing a light source module according to an embodiment.

FIG. 23 is a sectional view showing a light source module according to an embodiment.

As shown in FIG. 23, the light source module may include a substrate 100b and at least one light source 100a arranged on the substrate 100b.

The substrate 100b of the light source module may include a circuit pattern 152 electrically connected to the light source 100a and a film 154, exhibiting flexibility and insulativity, disposed on and/or under the circuit pattern 152.

As an example, the film 154 of the substrate 100b may be formed of any one selected from among photo solder resist (PSR), polyimide, and epoxy (for example, FR-4), or a combination thereof.

In a case in which the films 154 of the substrate 100b are disposed on and under the circuit pattern 152, the film disposed on the circuit pattern 152 may be different from that disposed under the circuit pattern 152.

In another embodiment, the substrate 100b of the light source module may be a printed circuit board (PCB) made of any one selected from among polyethylene terephthalate (PET), glass, polycarbonate (PC), silicon (Si), polyimide, and epoxy. As an example, a single layer PCB, multi layer PCB, ceramic substrate, or metal core PCB may be selectively used as the substrate 100b of the light source module.

The light source 100a of the light source module may be a top view type light emitting diode. According to circumstances, the light source 100a of the light source module may be a side view type light emitting diode.

The light source 100a of the light source module may be a light emitting diode (LED) chip. The LED chip may be a red LED chip, blue LED chip, or ultraviolet LED chip. Alternatively, the LED chip may be at least one selected from among a red LED chip, green LED chip, blue LED chip, yellow LED chip, and white LED chip, or a combination thereof.

As an example, in a case in which a lamp unit is applied to a taillight of a vehicle, the light source 100a of the light source module may be a vertical lighting emitting chip, such as a red lighting emitting chip. However, embodiments are not limited thereto.

Figure 24:
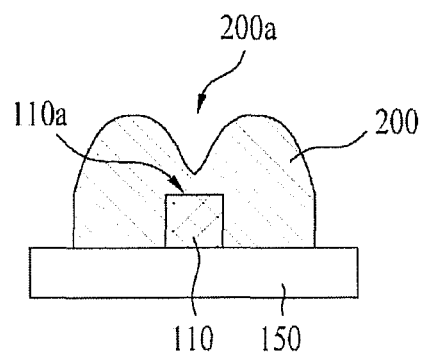
FIG. 24 is a sectional view showing a lens of the light source module.

FIG. 24 is a sectional view showing a lens of the light source module.

As shown in FIG. 24, the light source module may include a substrate 100b having an electrode pattern and a light source 100a arranged on the substrate 100b.

The light source 100a of the light source module may include a lens 200. The lens 200 may include a groove 200a disposed at a position corresponding to the central area of a light emission surface 100a-1 of the light source 100a.

The groove 200a may be formed in a conical or trapezoidal shape having a wide top and a narrow bottom in section.

The groove 200a is formed at the lens 200 to widen an orientation angle of light emitted from the light source 100a. However, embodiments are not limited thereto, and various types of lenses may be used.

Figure 25A:
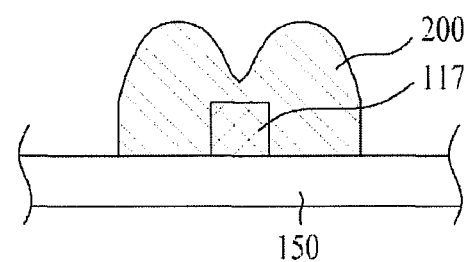
FIGS. 25A to 25C are sectional views showing types of the lens applied to the light source module.
Figure 25B:
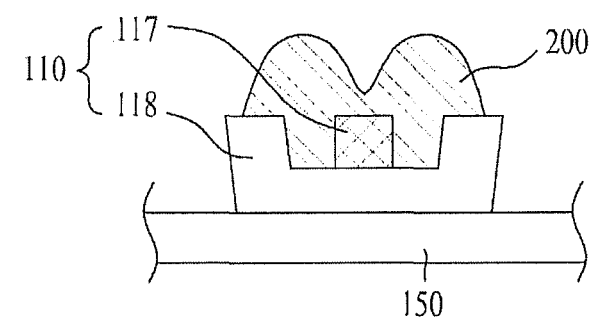
Figure 25C:
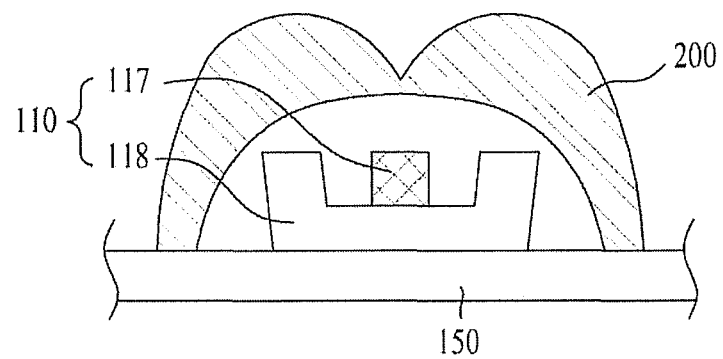

FIGS. 25A to 25C are sectional views showing types of the lens applied to the light source module.

As shown in FIGS. 25A to 25C, the light source module may include a substrate 100b, a light source, and a lens 200.

The light source of the light source module may be formed of an LED chip type or an LED package type in which an LED chip 117 is disposed in a package body 118.

The lens 200 may be disposed to cover the light source. Lenses 200 having various structures may be applied depending upon the type of the light source of the light source module.

For example, in a case in which the light source of the light source module is formed of a type in which the LED chip 117 is disposed on the substrate 100b, as shown in FIG. 25A, the lens 200 may be disposed on the substrate 100b to cover the LED chip 117.

Also, in a case in which the light source of the light source module is formed of an LED package type in which the LED chip 117 is disposed in the package body 118, as shown in FIG. 25B, the lens 200 may be disposed on the package body 118 to cover the LED chip 117.

Furthermore, in a case in which the light source of the light source module is formed of an LED package type in which the LED chip 117 is disposed in the package body 118, as shown in FIG. 25C, the lens 200 may be disposed on the substrate 100b to cover the entirety of the package body 118 including the LED chip 117.

The lens 200 may cover the LED package while being spaced apart from the package body 118 by a predetermined distance.

Figure 26A:
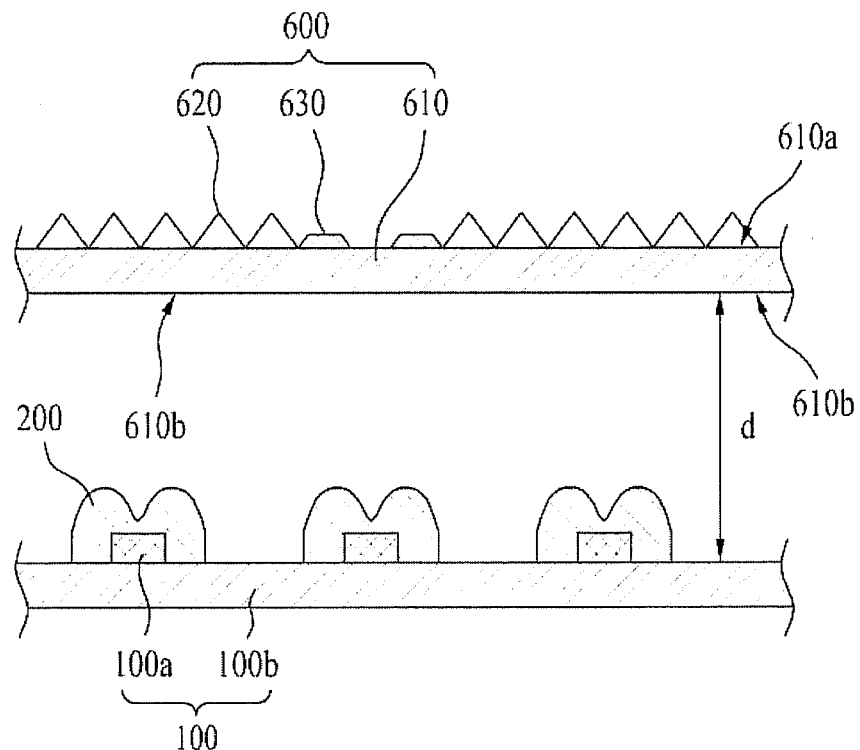
FIGS. 26A to 26C are views showing the distance between the light source module and the optical member.
Figure 26B:
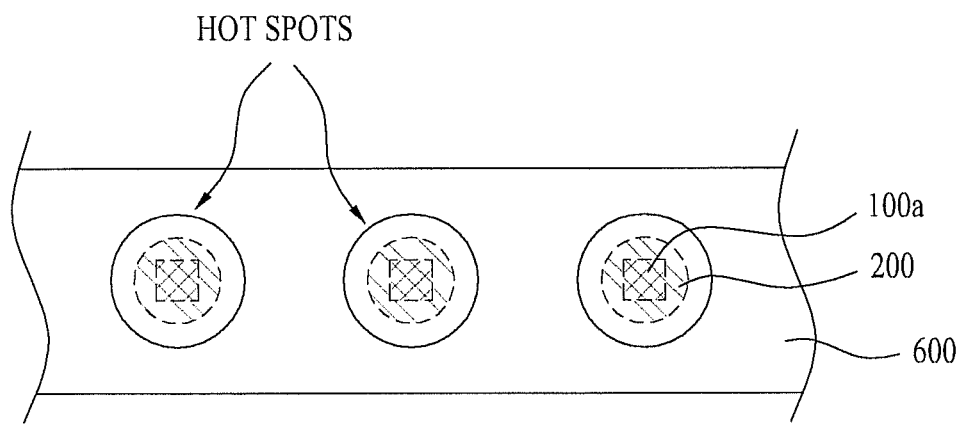
Figure 26C:
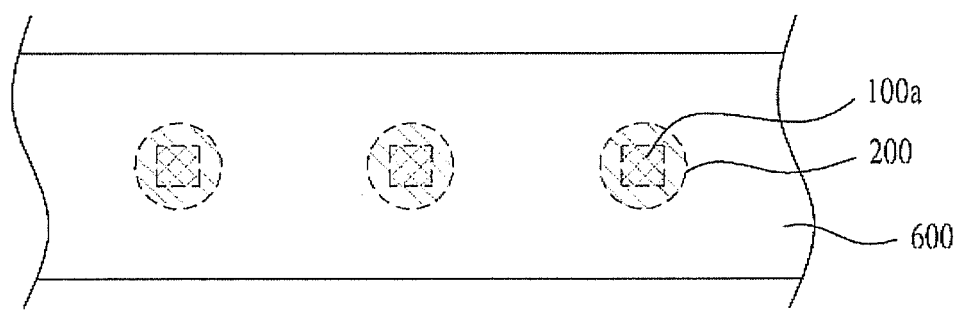

FIGS. 26A to 26C are views showing the distance between the light source module and the optical member. FIG. 26A is a sectional view showing the light source module and the optical member, and FIGS. 26B and 26C are plan views showing the top surface of the optical member.

As shown in FIG. 26A, the light source module 100 may include a substrate 100b having an electrode pattern and a plurality of light sources 100a arranged on the substrate 100b.

The plate 610 of the optical member 600 may include a top surface 610a at which first and second patterns 630 and 620 are disposed and a bottom surface 610b facing the substrate 100b of the light source module 100.

A distance d between the bottom surface 610b of the plate 610 and the substrate 100b of the light source module 100 may be about 10 mm or more.

If the distance between the optical member 600 and the light source module 100 is less than about 10 mm, the lamp may not exhibit uniform brightness. As a result, a hot spot phenomenon having high brightness at the area at which each light source 100a is located may occur. On the contrary, a dark spot phenomenon having low brightness may occur.

For example, if the distance between the optical member 600 and the light source module 100 is less than about 10 mm, as shown in FIG. 26B, a hot spot may occur at the area at which each light source 100a is located.

On the other hand, if the distance between the optical member 600 and the light source module 100 is about 10 mm or more, as shown in FIG. 26C, no hot spot may occur at the area at which each light source 100a is located, but brightness may be uniform throughout.

In this embodiment, therefore, the distance d between the optical member 600 and the light source module 100 is set to about 10 mm or more, and therefore, it is possible to provide a lamp capable of exhibiting uniform brightness.

Figure 27A:
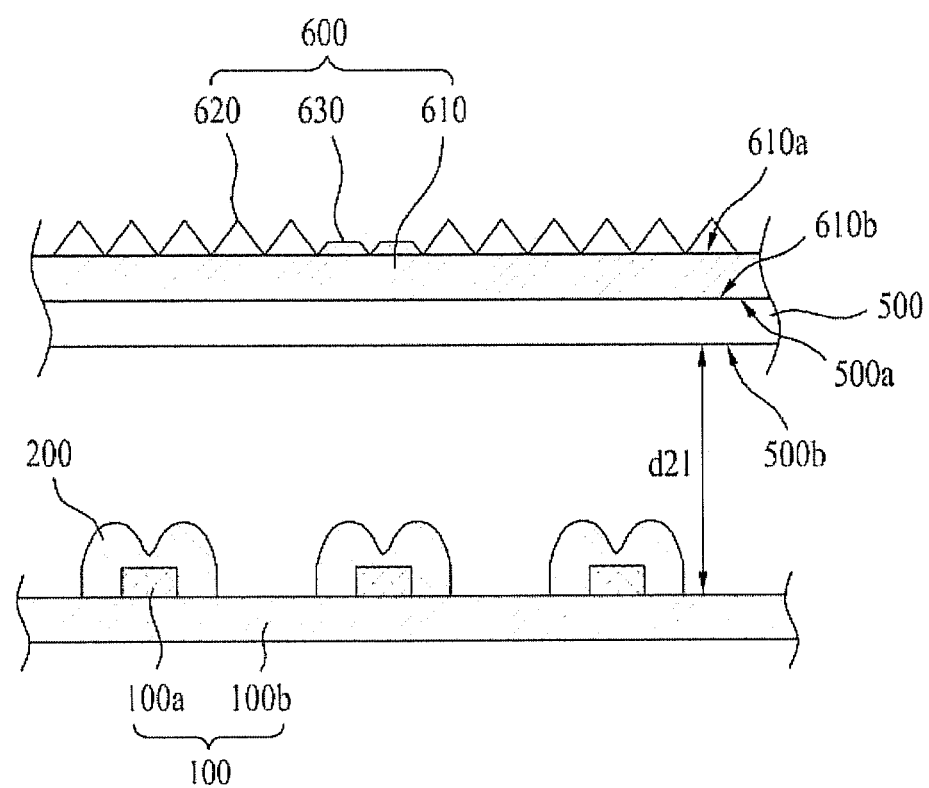
FIGS. 27A and 27B are sectional views showing the arrangement of a diffusion sheet.
Figure 27B:
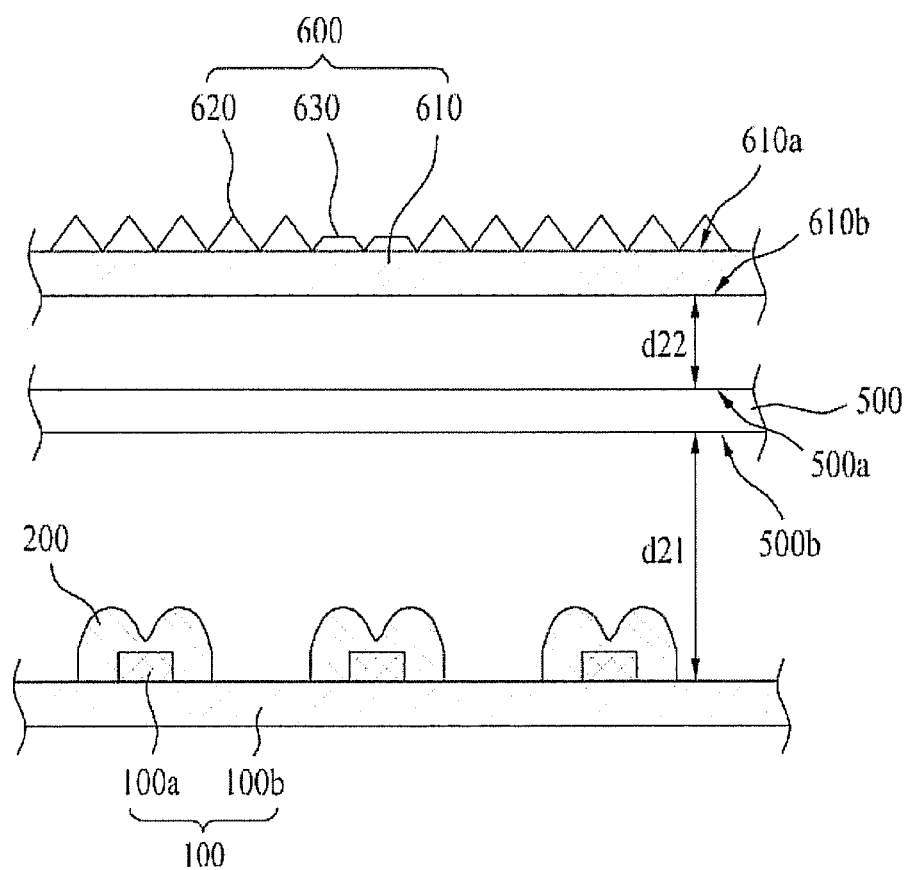

FIGS. 27A and 27B are sectional views showing the arrangement of a diffusion sheet.

As shown in FIGS. 27A and 27B, a diffusion sheet 500 to diffuse incident light may be disposed between the plate 610 of the optical member 600 and the light source module 100.

The light source module 100 may include a substrate 100b having an electrode pattern, a plurality of light sources 100a arranged on the substrate 100b, and lenses 200 corresponding to the respective light sources 100a.

The plate 610 of the optical member 600 may include a top surface 610a at which first and second patterns 630 and 620 are disposed and a bottom surface 610b facing a top surface 500a of the diffusion sheet 500.

The diffusion sheet 500 may include a top surface 500a facing the plate 610 of the optical member 600 and a bottom surface 500b facing the substrate 100b of the light source module 100.

A distance d between the bottom surface 500b of the diffusion sheet 500 and the substrate 100b of the light source module 100 may be about 10 mm or more.

For example, in a case in which the top surface 500a of the diffusion sheet 500 contacts the plate 610 of the optical member 600, as shown in FIG. 27A, a distance d21 between the bottom surface 500b of the diffusion sheet 500 and the substrate 100b of the light source module 100 may be about 10 mm or more.

If the distance d21 between the diffusion sheet 500 and the light source module 100 is less than about 10 mm, the lamp may not exhibit uniform brightness. As a result, a hot spot phenomenon having high brightness at the area at which each light source 100a is located may occur. On the contrary, a dark spot phenomenon having low brightness may occur.

According to circumstances, as shown in FIG. 27B, the top surface 500a of the diffusion sheet 500 may be spaced apart from the plate 610 of the optical member 600 by a distance d22, and the bottom surface 500b of the diffusion sheet 500 may be spaced apart from the substrate 100b of the light source module 100 by the distance d21.

The diffusion sheet 500 may be spaced apart from the plate 610 of the optical member 600 by a distance of about 0.1 mm to 10 mm and may be spaced apart from the light source module 100 by a distance of about 10 mm or more.

If the diffusion sheet 500 is spaced apart from the plate 610 of the optical member 600 by a distance of more than 10 mm, the total thickness of the lamp may be excessively increased. On the other hand, if the diffusion sheet 500 is spaced apart from the light source module 100 by a distance of less than 10 mm, a hot spot phenomenon may occur.

Figure 28A:
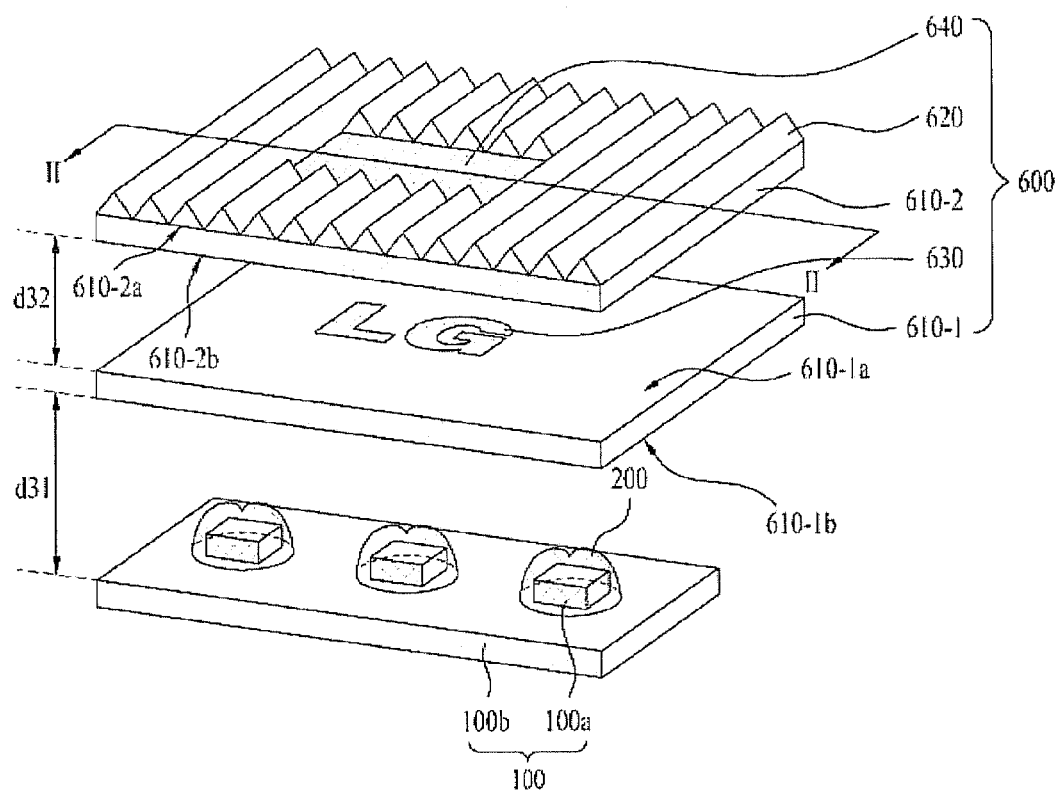
FIG. 28A is a perspective view showing the arrangement of an optical member and a light source module of a lamp according to a second embodiment.
Figure 28B:
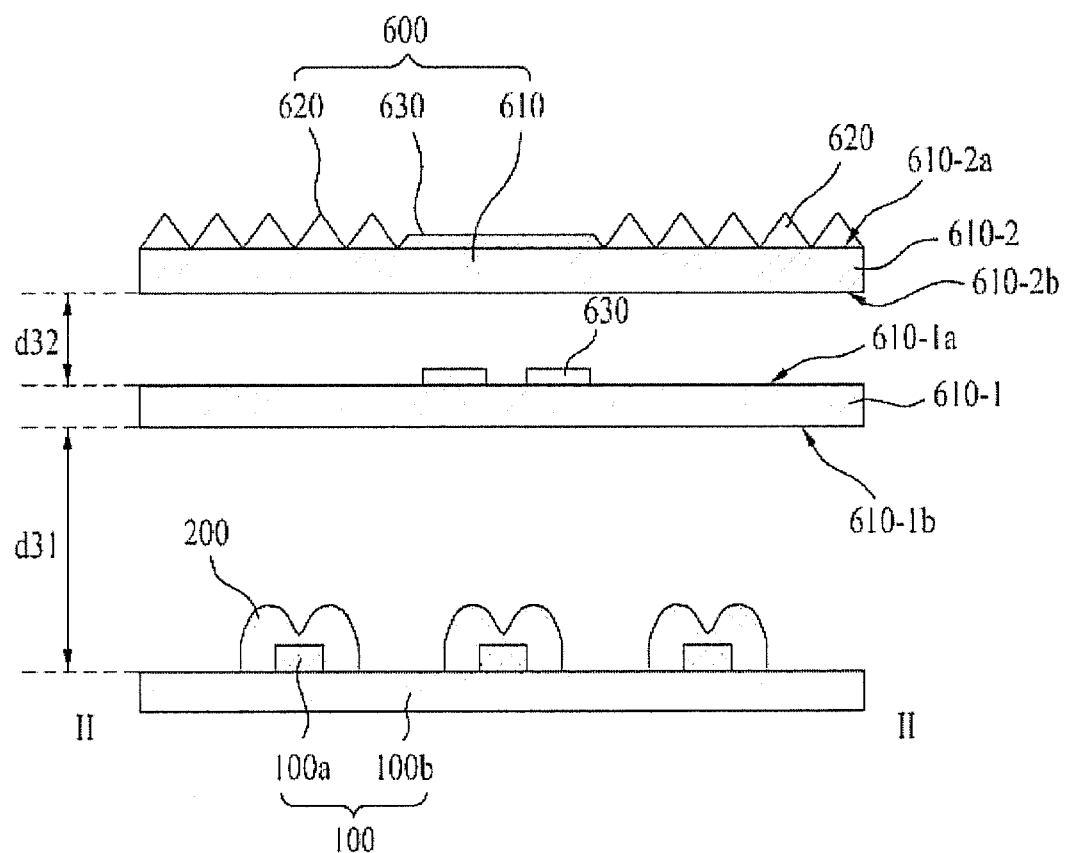
FIG. 28B is a sectional view taken along line II-II of FIG. 28A.

FIG. 28A is a perspective view showing the arrangement of an optical member and a light source module of a lamp according to a second embodiment, and FIG. 28B is a sectional view taken along line II-II of FIG. 28A.

As shown in FIGS. 28A and 28B, a light source module 100 may include a substrate 100b and a plurality of light sources 100a arranged on the substrate 100b.

Each light source 100a of the light source module 100 may include a lens 200. The lens 200 may include a groove disposed at a position corresponding to the central area of a light emission surface of each light source 100a.

An optical member 600 may be spaced apart from the substrate 100b by a predetermined distance.

The optical member 600 may include a first plate 610-1, second plate 610-2, first pattern 630, second pattern 620, and ground pattern 640.

The first plate 610-1 and the second plate 610-2 may be spaced apart from each other by a predetermined distance.

The first pattern 630 to display a predetermined emblem may be disposed at a top surface 610-1a of the first plate 610-1. The second pattern 620 to condense light incident from the light source module 100 and the ground pattern 640 may be disposed at a top surface 610-2a of the second plate 610-2.

The first and second plates 610-1 and 610-2 may be a light transmissive member or a light semi-transmissive member.

For example, the first and second plates 610-1 and 610-2 may be generally formed of acryl resin. However, embodiments are not limited thereto. In addition, the first and second plates 610-1 and 610-2 may be formed of a material having a light diffusion function, for example, highly-transmissive plastic, such as polystyrene (PS), polymethyl methacrylate (PMMA), cyclic olefin copolymer (COC), polyethylene terephthalate (PET), or resin.

The first and second plates 610-1 and 610-2 may be formed of different materials. According to circumstances, the first and second plates 610-1 and 610-2 may be formed of the same material.

The first pattern 630 may be at the top surface 610-1a of the first plate 610-1. The first pattern 630 may display a predetermined emblem.

The first pattern 630 may be at least one selected from among an embossed pattern, an engraved pattern, and a printed pattern. According to circumstances, the first pattern 630 may contain a plurality of fluorescent particles.

The second pattern 620 may be a protrusion protruding upward from the top surface 610-2a of the second plate 610-2. The vertical section of the protrusion may include a first surface and second surface facing each other. The angle between the first surface and second surface may be an obtuse angle or acute angle.

For example, the second pattern 620 may include a plurality of protrusions arranged side by side in one direction. The protrusions may be formed in a stripe shape.

The ground pattern 640 may be disposed at the top surface 610-2a of the second plate 610-2. The ground pattern 640 may be disposed at a position corresponding to the first pattern 630 of the first plate 610-1.

That is, the ground pattern 640 may improve visibility of the emblem displayed by the first pattern 630.

The ground pattern 640 may be different from the second pattern 620. According to circumstances, the ground pattern 640 may be identical to the second pattern 620.

The first plate 610-1 of the optical member 600 may include a top surface 610-1a at which the first pattern 630 is disposed and a bottom surface 610-1b facing the substrate 100b of the light source module 100.

A distance d31 between the bottom surface 610-1b of the first plate 610-1 and the substrate 100b of the light source module 100 may be about 10 mm or more.

The second plate 610-2 of the optical member 600 may include a top surface 610-2a at which the second pattern 620 and the ground pattern 640 are disposed and a bottom surface 610-2b facing the first plate 610-1.

A distance d32 between the bottom surface 610-2b of the second plate 610-2 and the top surface 610-1a of the first plate 610-1 may be about 0.1 mm to 10 mm.

If the distance d32 between the bottom surface 610-2b of the second plate 610-2 and the top surface 610-1a of the first plate 610-1 is more than 10 mm, vividness of the emblem may be lowered, and the total thickness of the lamp may be excessively increased.

Also, if the distance d31 between the bottom surface 610-1b of the first plate 610-1 and the substrate 100b of the light source module 100 is less than 10 mm, a hot spot phenomenon may occur.

As described above, the first plate 610-1 having the first pattern 630 is spaced apart from the second plate 610-2 having the second pattern 620 and the ground pattern 640 so that the emblem displayed by the first pattern 630 can appear three-dimensional.

In this embodiment, therefore, it is possible to provide excellent advertisement and public information effects.

The first plate 610-1 and the first pattern 630 of the optical member 600 may be separately manufactured and then coupled to each other. According to circumstances, the components of the optical member 600 may be integrated.

The second plate 610-2, the second pattern 620, and the ground pattern 640 of the optical member 600 may be separately manufactured and then coupled to one another. According to circumstances, the components of the optical member 600 may be selectively integrated.

Figure 29A:
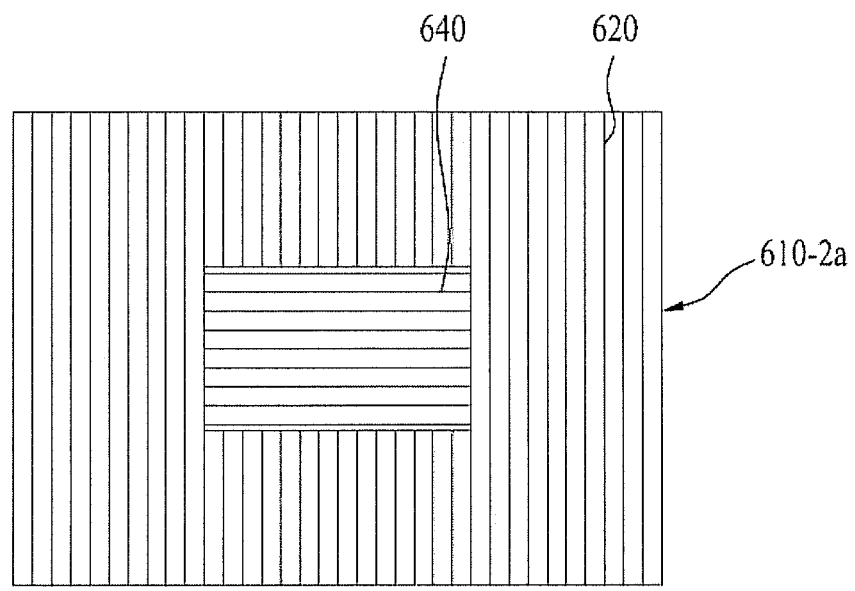
FIGS. 29A and 29B are plan views showing a ground pattern of the optical member of FIG. 28A.
Figure 29B:
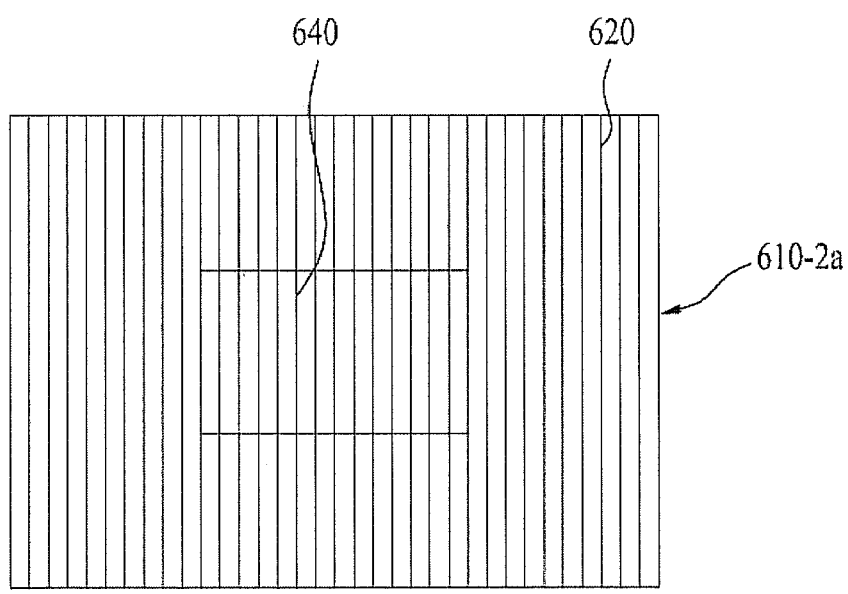

FIGS. 29A and 29B are plan views showing the ground pattern of the optical member of FIG. 28A.

As shown in FIGS. 29A and 29B, the optical member 600 may include a first plate 610-1 (see FIG. 29A), second plate 610-2, first pattern 630 (see FIG. 29A), second pattern 620, and ground pattern 640.

A first pattern 630 to display a predetermined emblem may be disposed at a top surface 610-1a of the first plate 610-1. The second pattern 620 to condense light incident from the light source module and the ground pattern 640 may be disposed at a top surface 610-2a of the second plate 610-2.

The ground pattern 640 may be disposed at a position corresponding to the first pattern 630 of the first plate 610-1. The ground pattern 640 may improve visibility of the emblem displayed by the first pattern 630.

The ground pattern 640 may be different from the second pattern 620. According to circumstances, the ground pattern 640 may be identical to the second pattern 620.

For example, as shown in FIG. 29A, the second pattern 620 may be configured such that a plurality of protrusions formed in a stripe shape is arranged side by side in a first direction, and the ground pattern 640 may be configured so that a plurality of protrusions formed in a stripe shape is arranged side by side in a second direction perpendicular to the first direction.

According to circumstances, as shown in FIG. 29B, the second pattern 620 may be configured such that a plurality of protrusions formed in a stripe shape is arranged side by side in a first direction, and the ground pattern 640 may be configured so that a plurality of protrusions formed in a stripe shape is arranged side by side in the same direction as the first direction in which the protrusions of the second pattern 620 are arranged.

In a case in which the protrusions of the ground pattern 640 are arranged side by side in the same direction as the first direction in which the protrusions of the second pattern 620 are arranged, the intervals between the protrusions of the ground pattern 640 may be narrower or wider than those between the protrusions of the second pattern 620.

The ground pattern 640 is arranged as described above to prevent lowering in vividness of the emblem due to light refracted by the second pattern 620.

Figure 30A:
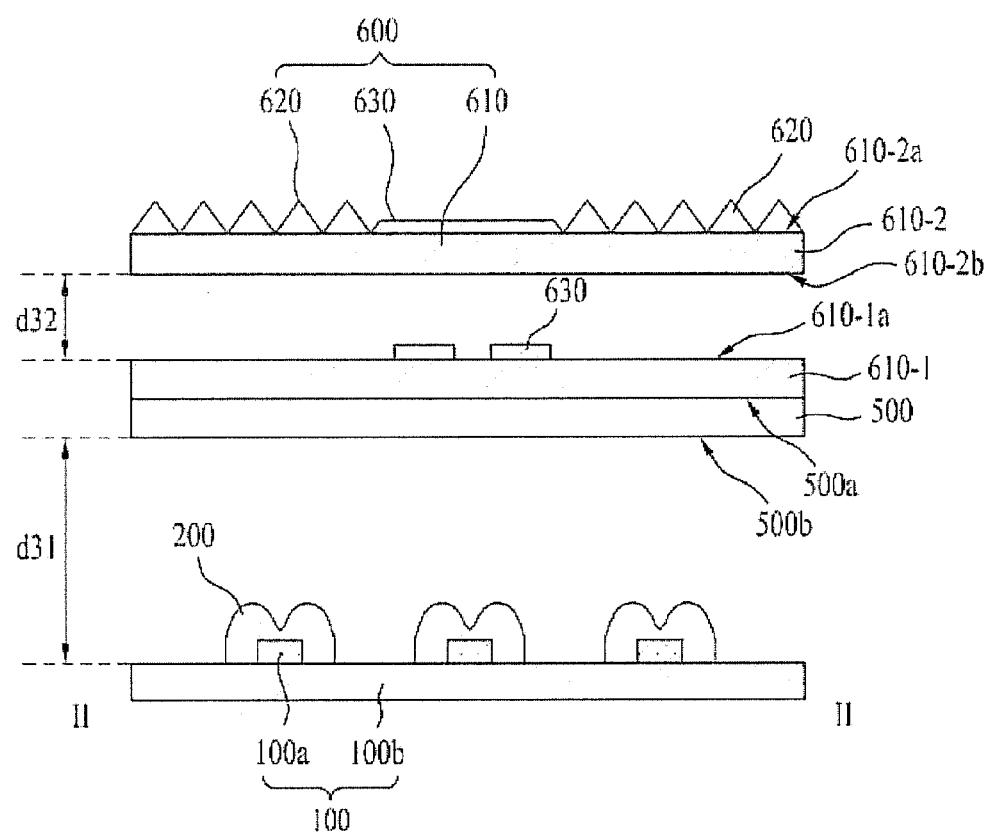
FIGS. 30A and 30B are sectional views showing a diffusion sheet disposed at the optical member of FIG. 28A.
Figure 30B:
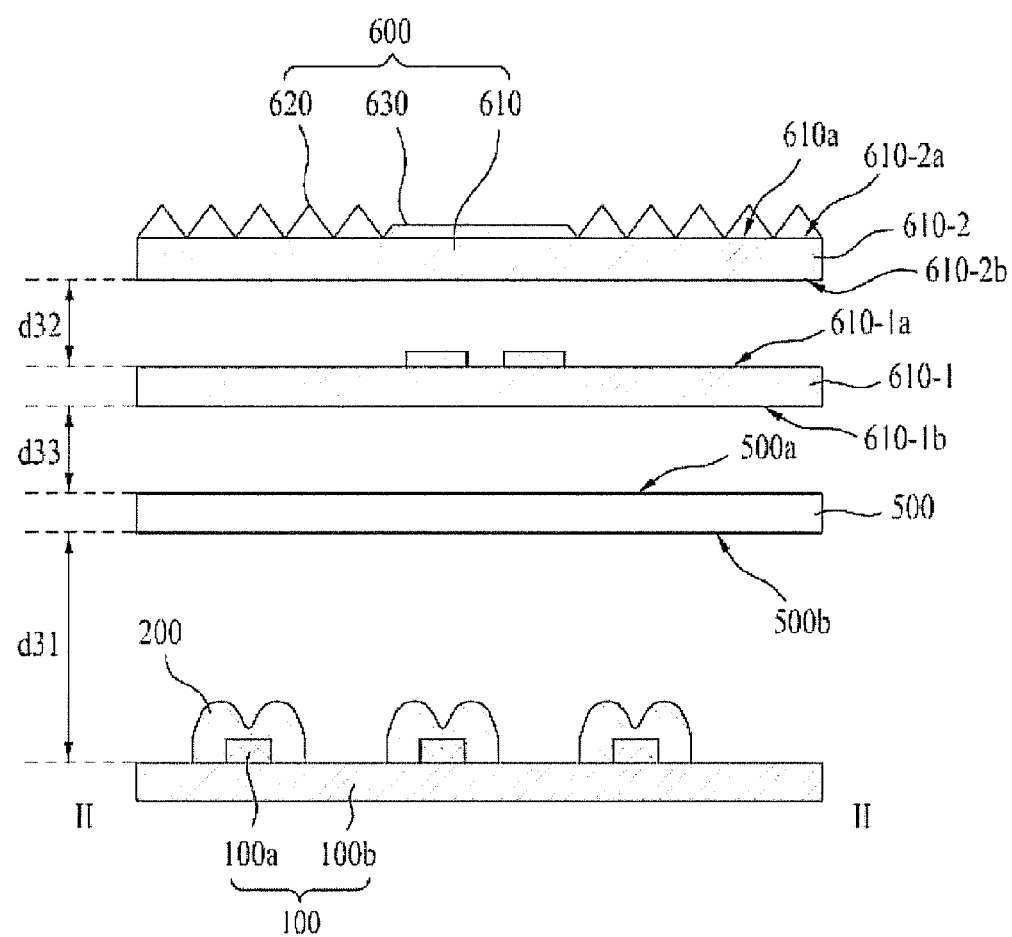

FIGS. 30A and 30B are sectional views showing a diffusion sheet disposed at the optical member of FIG. 28A.

As shown in FIGS. 30A and 30B, a diffusion sheet 500 to diffuse incident light may be disposed between the first plate 610-1 of the optical member 600 and the light source module 100.

The light source module 100 may include a substrate 100b having an electrode pattern, a plurality of light sources 100a arranged on the substrate 100b, and lenses 200 corresponding to the respective light sources 100a.

The first plate 610-1 of the optical member 600 may include a top surface 610-1a at which the first pattern 630 is disposed and a bottom surface 610-1b facing a top surface 500a of the diffusion sheet 500.

The second plate 610-2 of the optical member 600 may include a top surface 610-2a at which the second pattern 620 and the ground pattern 640 are disposed and a bottom surface 610-2b facing the first plate 610-1.

A distance d32 between the bottom surface 610-2b of the second plate 610-2 and the top surface 610-1a of the first plate 610-1 may be about 0.1 mm to 10 mm.

If the distance d32 between the bottom surface 610-2b of the second plate 610-2 and the top surface 610-1a of the first plate 610-1 is more than 10 mm, vividness of the emblem may be lowered, and the total thickness of the lamp may be excessively increased.

The diffusion sheet 500 may include a top surface 500a facing the first plate 610-1 of the optical member 600 and a bottom surface 500b facing the substrate 100b of the light source module 100.

The distance between the bottom surface 500b of the diffusion sheet 500 and the substrate 100b of the light source module 100 may be about 10 mm or more.

For example, in a case in which the top surface 500a of the diffusion sheet 500 contacts the first plate 610-1 of the optical member 600, as shown in FIG. 30A, a distance d31 between the bottom surface 500b of the diffusion sheet 500 and the substrate 100b of the light source module 100 may be about 10 mm or more.

If the distance d31 between the diffusion sheet 500 and the light source module 100 is less than about 10 mm, the lamp may not exhibit uniform brightness. As a result, a hot spot phenomenon having high brightness at the area at which each light source 100a is located may occur. On the contrary, a dark spot phenomenon having low brightness may occur.

According to circumstances, as shown in FIG. 30B, the top surface 500a of the diffusion sheet 500 may be spaced apart from the first plate 610-1 of the optical member 600 by a distance d33, and the bottom surface 500b of the diffusion sheet 500 may be spaced apart from the substrate 100b of the light source module 100 by the distance d31.

The diffusion sheet 500 may be spaced apart from the first plate 610-1 of the optical member 600 by a distance of about 0.1 mm to 10 mm and may be spaced apart from the light source module 100 by a distance of about 10 mm or more.

If the diffusion sheet 500 is spaced apart from the first plate 610-1 of the optical member 600 by a distance of more than 10 mm, the total thickness of the lamp may be excessively increased. On the other hand, if the diffusion sheet 500 is spaced apart from the light source module 100 by a distance of less than 10 mm, a hot spot phenomenon may occur.

The first plate 610-1, the diffusion sheet 500, and the first pattern 630 may be separately manufactured and then coupled to one another. According to circumstances, the components of the optical member 600 may be selectively integrated.

Also, the second plate 610-2, the second pattern 620, and the ground pattern 640 of the optical member 600 may be separately manufactured and then coupled to one another. According to circumstances, the components of the optical member 600 may be selectively integrated.

Figure 31A:
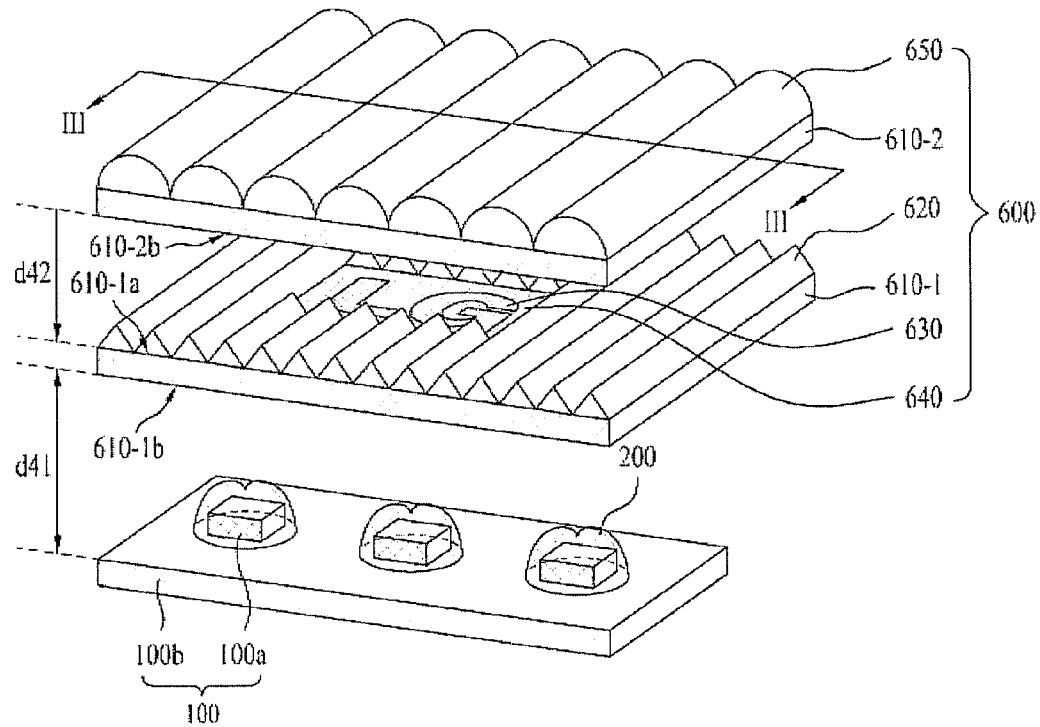
FIG. 31A is a perspective view showing the arrangement of an optical member and a light source module of a lamp according to a third embodiment.
Figure 31B:
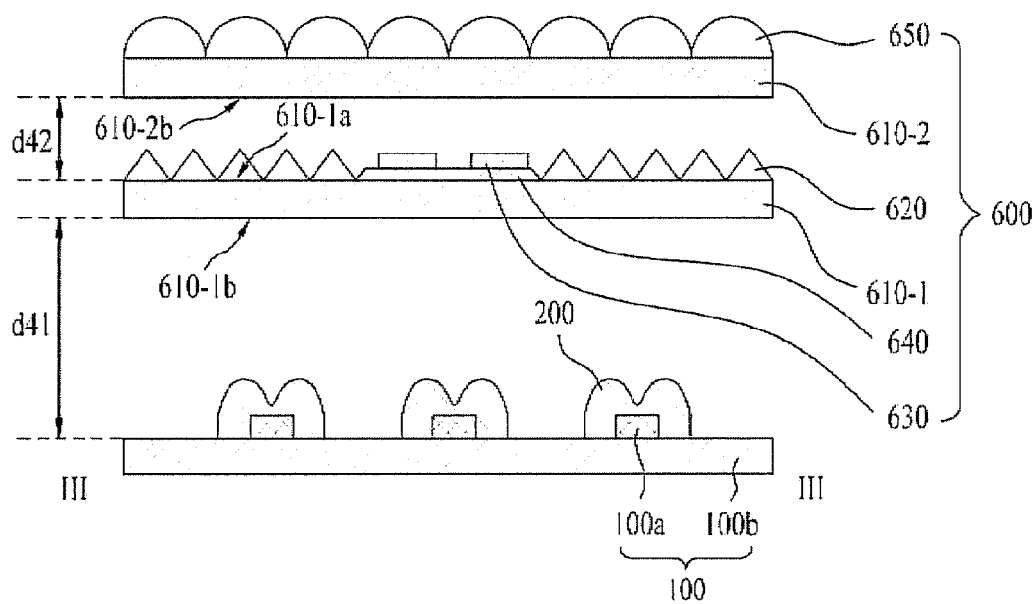
FIG. 31B is a sectional view taken along line III-III of FIG. 31A.

FIG. 31A is a perspective view showing the arrangement of an optical member and a light source module of a lamp according to a third embodiment, and FIG. 31B is a sectional view taken along line III-III of FIG. 31A.

As shown in FIGS. 31A and 31B, a light source module 100 may include a substrate 100b and a plurality of light sources 100a arranged on the substrate 100b.

Each light source 100a of the light source module 100 may include a lens 200. The lens 200 may include a groove disposed at a position corresponding to the central area of a light emission surface of each light source 100a.

An optical member 600 may be spaced apart from the substrate 100b by a predetermined distance.

The optical member 600 may include a first plate 610-1, second plate 610-2, first pattern 630, second pattern 620, and ground pattern 640.

The first plate 610-1 and the second plate 610-2 may be spaced apart from each other by a predetermined distance.

The first pattern 630 to display a predetermined emblem may be disposed at a top surface 610-1a of the first plate 610-1. The second pattern 620 to condense light incident from the light source module 100 and the ground pattern 640 may also be disposed at the top surface 610-1a of the first plate 610-1.

The first plate 610-1 may be a light transmissive member or a light semi-transmissive member.

For example, the first plate 610-1 may be generally formed of acryl resin. However, embodiments are not limited thereto. In addition, the first and second plates 610-1 and 610-2 may be formed of a material having a light diffusion function, for example, highly-transmissive plastic, such as polystyrene (PS), polymethyl methacrylate (PMMA), cyclic olefin copolymer (COC), polyethylene terephthalate (PET), or resin.

The first pattern 630 may be formed at the top surface 610-1a of the first plate 610-1. The first pattern 630 may display a predetermined emblem.

The first pattern 630 may be at least one selected from among an embossed pattern, an engraved pattern, and a printed pattern. According to circumstances, the first pattern 630 may contain a plurality of fluorescent particles.

The second pattern 620 may be a protrusion protruding upward from the top surface 610-1a of the first plate 610-1. The vertical section of the protrusion may include a first surface and second surface facing each other. The angle between the first surface and second surface may be an obtuse angle or acute angle.

For example, the second pattern 620 may include a plurality of protrusions arranged side by side in one direction. The protrusions may be formed in a stripe shape.

The ground pattern 640 may be disposed so as to surround the first pattern 630, thereby improving visibility of the emblem displayed by the first pattern 630.

The ground pattern 640 may be different from the second pattern 620. According to circumstances, the ground pattern 640 may be identical to the second pattern 620.

At the top surface of the second plate 610-2 may be disposed a plurality of lenses 650 to display an emblem having different viewpoints.

Each lens 650 of the second plate 610-2 may be a semicircular or hemispherical lens. The lenses 650 may enable the emblem displayed by the first pattern 630 to appear three-dimensional.

That is, the lenses 650 may display an emblem having different viewpoints so that the emblem can appear three-dimensional.

The first plate 610-1 of the optical member 600 may include a top surface 610-1a at which the first and second patterns 630 and 620 are disposed and a bottom surface 610-1b facing the substrate 100b of the light source module 100.

A distance d41 between the bottom surface 610-1b of the first plate 610-1 and the substrate 100b of the light source module 100 may be about 10 mm or more.

The second plate 610-2 of the optical member 600 may include a top surface 610-2a at which the lenses 650 are disposed and a bottom surface 610-2b facing the first plate 610-1.

A distance d42 between the bottom surface 610-2b of the second plate 610-2 and the top surface 610-1a of the first plate 610-1 may be about 0.1 mm to 10 mm.

If the distance d42 between the bottom surface 610-2b of the second plate 610-2 and the top surface 610-1a of the first plate 610-1 is more than 10 mm, vividness of the emblem may be lowered, and the total thickness of the lamp may be excessively increased.

Also, if the distance d41 between the bottom surface 610-1b of the first plate 610-1 and the substrate 100b of the light source module 100 is less than 10 mm, a hot spot phenomenon may occur.

As described above, the first plate 610-1 having the first pattern 630 is spaced apart from the second plate 610-2 having the lenses 650 so that the emblem displayed by the first pattern 630 can appear three-dimensional.

In this embodiment, therefore, it is possible to provide excellent advertisement and public information effects.

The first plate 610-1, the second plate 610-2, the first pattern 630, the second pattern 620, the ground pattern 640, and the lenses 650 of the optical member 600 may be separately manufactured and then coupled to each other. According to circumstances, the components of the optical member 600 may be selectively integrated.

Figure 32A:
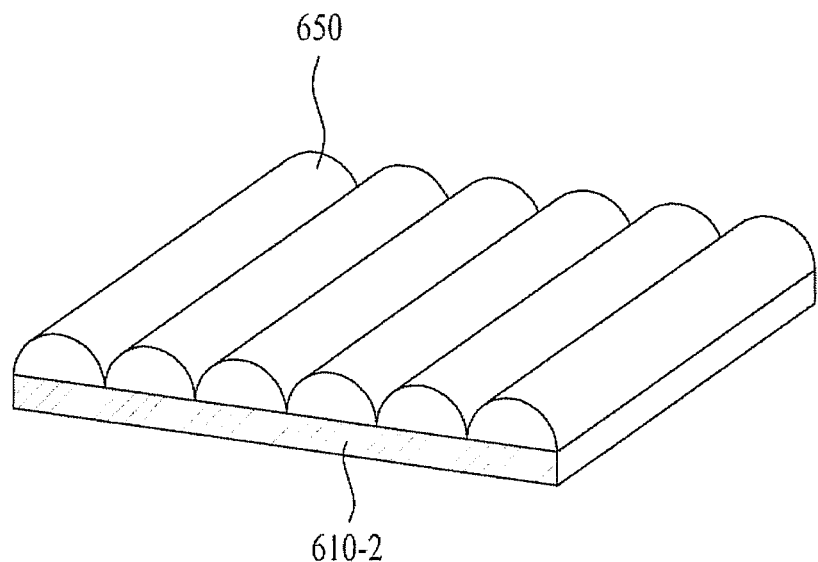
FIGS. 32A and 32B are perspective views showing a second plate of FIG. 31A.
Figure 32B:
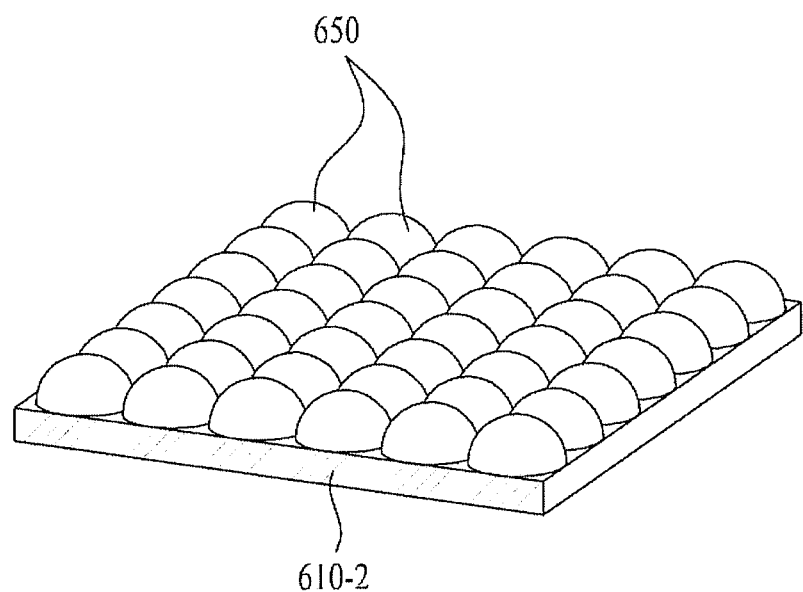

FIGS. 32A and 32B are perspective views showing the second plate of FIG. 31A.

As shown in FIGS. 32A and 32B, a plurality of lenses 650 to display an emblem having different viewpoints may be disposed at the top surface of the second plate 610-2.

Each lens 650 of the second plate 610-2 may be a semicircular lens as shown in FIG. 32A. A plurality of semicircular lenses may be arranged side by side.

According to circumstances, each lens 650 of the second plate 610-2 may be a hemispherical lens as shown in FIG. 32B. A plurality of hemispherical lenses may be arranged side by side.

The lenses 650 of the second plate 610-2 may display an emblem having different viewpoints so that the emblem can appear three-dimensional.

Figure 33A:
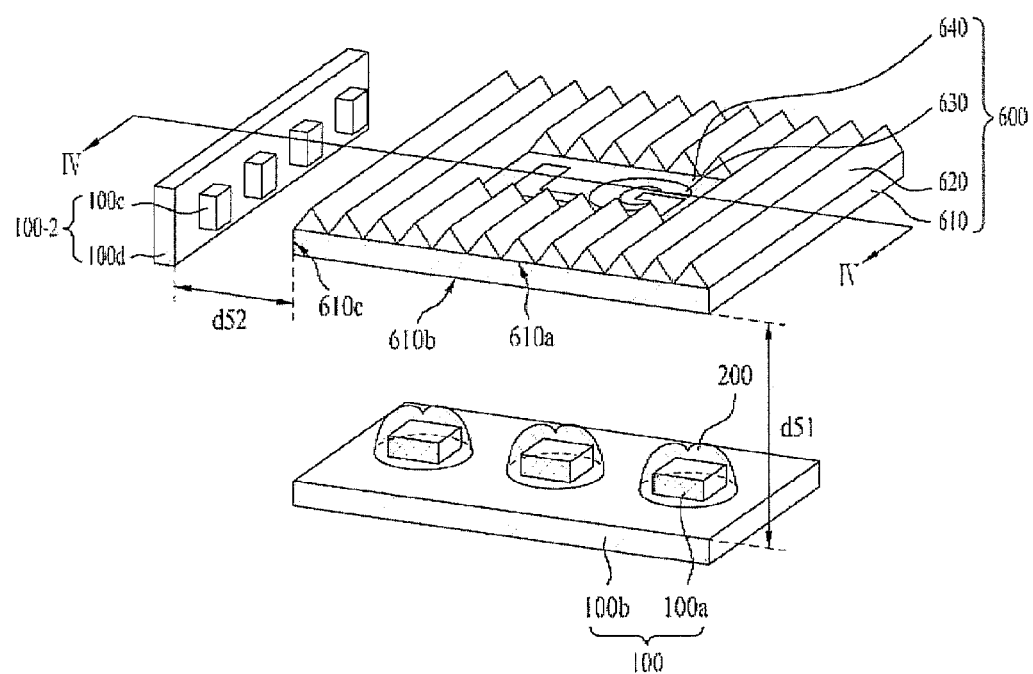
FIG. 33A is a perspective view showing the arrangement of an optical member and light source modules of a lamp according to a fourth embodiment.
Figure 33B:
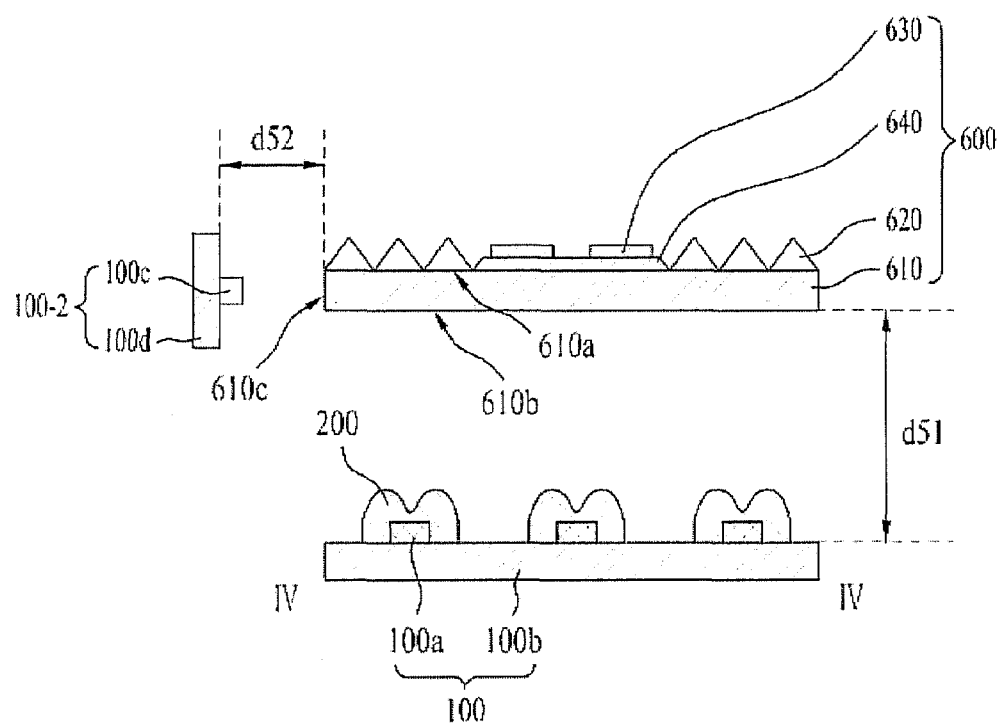
FIG. 33B is a sectional view taken along line IV-IV of FIG. 33A.

FIG. 33A is a perspective view showing the arrangement of an optical member and light source modules of a lamp according to a fourth embodiment, and FIG. 33B is a sectional view taken along line IV-IV of FIG. 33A.

As shown in FIGS. 33A and 33B, an optical member 600 may be spaced apart from first and second light source modules 100-1 and 100-2 by predetermined distances.

The first light source module 100-1 may be disposed under the optical member 600, and the second light source module 100-2 may be disposed beside the optical member 600.

The first light source module 100-1 may include a first substrate 100b and a plurality of first light sources 100a arranged on the first substrate 100b.

Each first light source 100a of the first light source module 100-1 may include a lens 200. The lens 200 may include a groove disposed at a position corresponding to the central area of a light emission surface of each first light source 100a.

The second light source module 100-2 may include a second substrate 100d and a plurality of second light sources 100c arranged on the second substrate 100d.

Each second light source 100c of the second light source module 100-2 does not include a lens 200. According to circumstances, however, each second light source 100c of the second light source module 100-2 may include a lens 200.

The optical member 600 may include a plate 610, a first pattern 630, a second pattern 620, and a ground pattern 640.

The first pattern 630 to display a predetermined emblem may be disposed at a top surface 610a of the plate 610. The second pattern 620 to condense light incident from the light source module 100 and the ground pattern 640 may also be disposed at the top surface 610a of the plate 610.

The first pattern 630 may be at least one selected from among an embossed pattern, an engraved pattern, and a printed pattern. According to circumstances, the first pattern 630 may contain a plurality of fluorescent particles.

Also, the second pattern 620 may include a plurality of protrusions arranged side by side in one direction. The protrusions may be formed in a stripe shape.

The ground pattern 640 may be disposed so as to surround the first pattern 630, thereby improving visibility of the emblem displayed by the first pattern 630.

The plate 610 of the optical member 600 may include a top surface 610a at which the first and second patterns 630 and 620 and the ground pattern 640 are disposed, a bottom surface 610b facing the first substrate 100b of the first light source module 100-1, and a side surface 610c facing the second substrate 100d of the second light source module 100-2.

A distance d51 between the bottom surface 610b of the plate 610 and the first substrate 100b of the first light source module 100-1 may be different from a distance d52 between the side surface 610c of the plate 610 and the second substrate 100d of the second light source module 100-2.

For example, the distance d51 between the bottom surface 610b of the plate 610 and the first substrate 100b of the first light source module 100-1 may be about 10 mm or more, and the distance d52 between the side surface 610c of the plate 610 and the second substrate 100d of the second light source module 100-2 may be about 0.1 mm to 10 mm.

If the distance d51 between the bottom surface 610b of the plate 610 and the first substrate 100b of the first light source module 100-1 is less than about 10 mm, a hot spot phenomenon may occur.

Also, if the distance d52 between the side surface 610c of the plate 610 and the second substrate 100d of the second light source module 100-2 is more than 10 mm, vividness of the emblem may be lowered, and the total thickness of the lamp may be excessively increased.

In a case in which the light source modules are disposed at the bottom surface 610b and the side surface 610c of the plate as described above, it is possible to improve vividness of the emblem in an environment as bright as the daytime as well as in the nighttime.

According to circumstances, the distance d51 between the bottom surface 610b of the plate 610 and the first substrate 100b of the first light source module 100-1 may be equal to the distance d52 between the side surface 610c of the plate 610 and the second substrate 100d of the second light source module 100-2.

Also, the number of the first light sources 100a of the first light source module 100-1 may be different from that of the second light sources 100c of the second light source module 100-2.

For example, the number of the second light sources 100c of the second light source module 100-2 may be less than that of the first light sources 100a of the first light source module 100-1.

This is because the second light source module 100-2 is an auxiliary light source driven when vividness of the emblem is lowered in an environment as bright as the daytime.

Consequently, only the first light source module 100-1 may be driven in an environment as dark as the nighttime, and both the first light source module 100-1 and the second light source module 100-2 may be driven in an environment as bright as the daytime.

In this embodiment, therefore, the light source modules are disposed under and beside the optical member, it is possible to improve vividness of the emblem in an environment as bright as the daytime as well as in the nighttime.

The plate 610, the first pattern 630, the second pattern 620, and the ground pattern 640 of the optical member 600 may be separately manufactured and then coupled to one another. According to circumstances, the components of the optical member 600 may be selectively integrated.

Figure 34A:
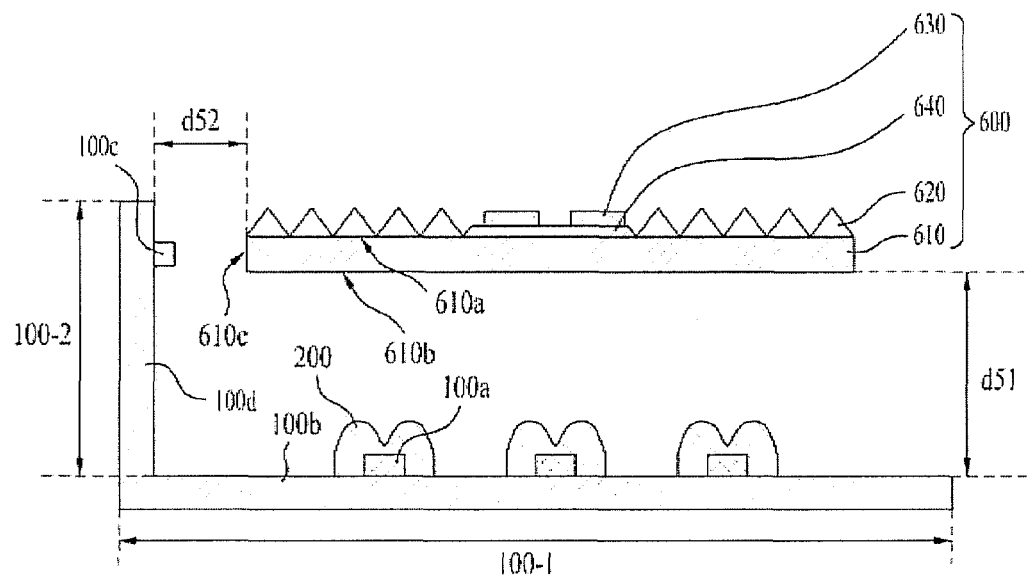
FIGS. 34A and 34B are sectional views showing the arrangement of an optical member and light source modules of a lamp according to a fifth embodiment.
Figure 34B:
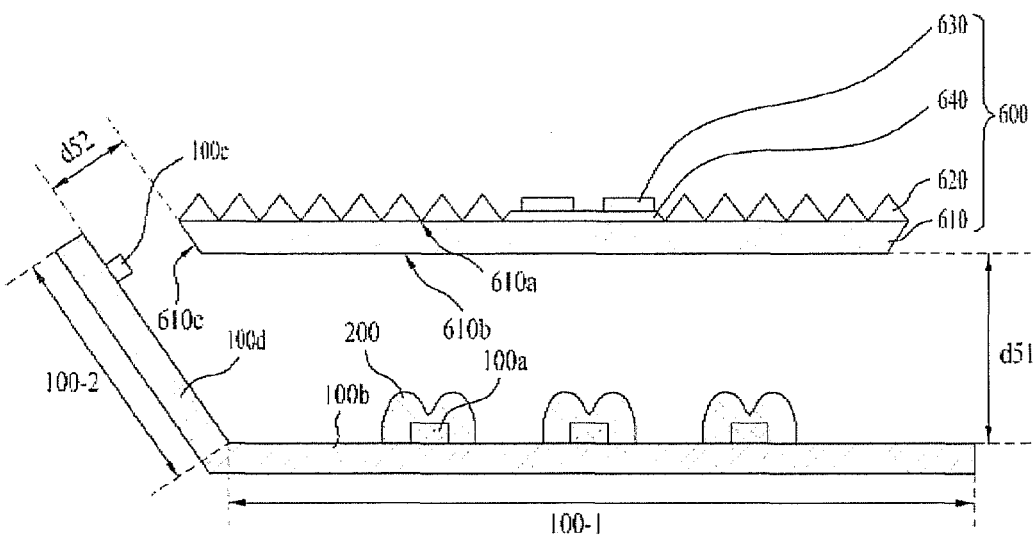

FIGS. 34A and 34B are sectional views showing the arrangement of an optical member and light source modules of a lamp according to a fifth embodiment.

As shown in FIGS. 34A and 34B, an optical member 600 may be spaced apart from first and second light source modules 100-1 and 100-2 by predetermined distances.

The first light source module 100-1 may be disposed under the optical member 600, and the second light source module 100-2 may be disposed beside the optical member 600.

The first light source module 100-1 may include a first substrate 100b and a plurality of first light sources 100a arranged on the first substrate 100b.

The second light source module 100-2 may include a second substrate 100d and a plurality of second light sources 100c arranged on the second substrate 100d.

The first substrate 100b of the first light source module 100-1 and the second substrate 100d of the second light source module 100-2 may be connected to each other.

For example, as shown in FIG. 34A, the second substrate 100d of the second light source module 100-2 may be perpendicular to the first substrate 100b of the first light source module 100-1.

According to circumstances, as shown in FIG. 34B, the second substrate 100d of the second light source module 100-2 may be at an angle to the first substrate 100b of the first light source module 100-1.

An angle θ30 between the first substrate 100b and the second substrate 100d may be an obtuse angle.

The second substrate 100d and a side surface 600c of the plate 610 may be parallel to each other. In a case in which the second substrate 100d is at an angle to the first substrate 100b as shown in FIG. 34B, therefore, the side surface 600c of the plate 610 may also be at an angle to a bottom surface 610b of the plate 610.

The optical member 600 may include a plate 610, a first pattern 630, a second pattern 620, and a ground pattern 640.

The first pattern 630 to display a predetermined emblem may be disposed at a top surface 610a of the plate 610. The second pattern 620 to condense light incident from the light source module 100 and the ground pattern 640 may also be disposed at the top surface 610a of the plate 610.

The first pattern 630 may be at least one selected from among an embossed pattern, an engraved pattern, and a printed pattern. According to circumstances, the first pattern 630 may contain a plurality of fluorescent particles.

Also, the second pattern 620 may include a plurality of protrusions arranged side by side in one direction. The protrusions may be formed in a stripe shape.

The ground pattern 640 may be disposed so as to surround the first pattern 630, thereby improving visibility of the emblem displayed by the first pattern 630.

The plate 610 of the optical member 600 may include a top surface 610a at which the first and second patterns 630 and 620 and the ground pattern 640 are disposed, a bottom surface 610b facing the first substrate 100b of the first light source module 100-1, and a side surface 610c facing the second substrate 100d of the second light source module 100-2.

A distance d51 between the bottom surface 610b of the plate 610 and the first substrate 100b of the first light source module 100-1 may be different from a distance d52 between the side surface 610c of the plate 610 and the second substrate 100d of the second light source module 100-2.

For example, the distance d51 between the bottom surface 610b of the plate 610 and the first substrate 100b of the first light source module 100-1 may be about 10 mm or more, and the distance d52 between the side surface 610c of the plate 610 and the second substrate 100d of the second light source module 100-2 may be about 0.1 mm to 10 mm.

If the distance d51 between the bottom surface 610b of the plate 610 and the first substrate 100b of the first light source module 100-1 is less than about 10 mm, a hot spot phenomenon may occur.

Also, if the distance d52 between the side surface 610c of the plate 610 and the second substrate 100d of the second light source module 100-2 is more than 10 mm, vividness of the emblem may be lowered, and the total thickness of the lamp may be excessively increased.

In a case in which the light source modules are disposed at the bottom surface 610b and the side surface 610c of the plate as described above, it is possible to improve vividness of the emblem in an environment as bright as the daytime as well as in the nighttime.

According to circumstances, the distance d51 between the bottom surface 610b of the plate 610 and the first substrate 100b of the first light source module 100-1 may be equal to the distance d52 between the side surface 610c of the plate 610 and the second substrate 100d of the second light source module 100-2.

Also, the number of the first light sources 100a of the first light source module 100-1 may be different from that of the second light sources 100c of the second light source module 100-2.

For example, the number of the second light sources 100c of the second light source module 100-2 may be less than that of the first light sources 100a of the first light source module 100-1.

This is because the second light source module 100-2 is an auxiliary light source driven when vividness of the emblem is lowered in an environment as bright as the daytime.

Consequently, only the first light source module 100-1 may be driven in an environment as dark as the nighttime, and both the first light source module 100-1 and the second light source module 100-2 may be driven in an environment as bright as the daytime.

In this embodiment, therefore, the light source modules are disposed under and beside the optical member, it is possible to improve vividness of the emblem in an environment as bright as the daytime as well as in the nighttime.

Figure 35:
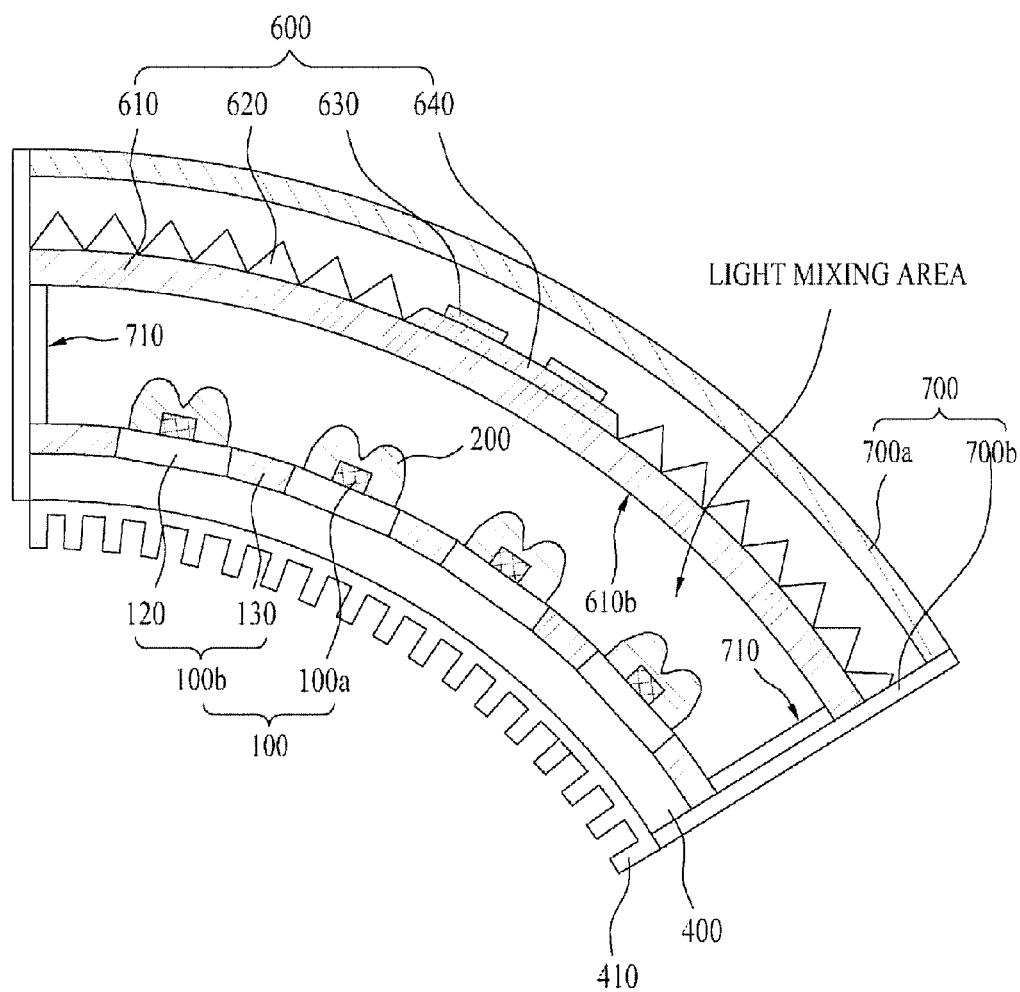
FIG. 35 is a sectional view showing a lamp for vehicles according to an embodiment.

FIG. 35 is a sectional view showing a lamp for vehicles according to an embodiment.

As shown in FIG. 35, the lamp for vehicles may include a light source module 100, a heat dissipation member 400, an optical member 600, and a cover member 700.

A top surface of the heat dissipation member 400 may face the inside of the lamp. The top surface of the heat dissipation member 400 may contact the light source module 100. A bottom surface of the heat dissipation member 400 may face the outside of the lamp. A plurality of heat dissipation pins 410 may be disposed at the bottom surface of the heat dissipation member 400.

The light source module 100 may include a substrate 100b having an electrode pattern and a plurality of light sources 100a arranged on the substrate 100b.

The substrate 100b of the light source module 100 may include a plurality of supporting portions 120 disposed so as to correspond to the respective light sources 100a and a plurality of connecting portions 130 disposed between neighboring supporting portions 120.

The substrate 100b of the light source module 100 may be manufactured so as to exhibit flexibility. The substrate 100b of the light source module 100 may be a printed circuit board (PCB) made of any one selected from among polyethylene terephthalate (PET), glass, polycarbonate (PC), silicon (Si), polyimide, and epoxy. The substrate 100b of the light source module 100 may be formed in a film shape.

Also, a single layer PCB, multi layer PCB, ceramic substrate, or metal core PCB may be selectively used as the substrate 100b of the light source module 100.

The entirety of the substrate 100b of the light source module 100 may be formed of the same material. According to circumstances, a portion of the substrate 100b may be formed of a material different from that of the remaining portion of the substrate 100b.

For example, the supporting portions 120 and the connecting portions 130 of the substrate 100b may be formed of the same material. As an example, the supporting portions 120 and the connecting portions 130 of the substrate 100b may each include a base member and a circuit pattern disposed on at least one surface of the base member. The base member may be formed of a film, such as polyimide or epoxy (for example, FR-4), exhibiting flexibility and insulativity.

According to circumstances, the supporting portions 120 and the connecting portions 130 of the substrate 100b may be formed of different materials.

As an example, the supporting portions 120 of the substrate 100b may be conductors, and the connecting portions 130 of the substrate 100b may be nonconductors.

Also, the supporting portions 120 of the substrate 100b may be formed of a hard material which is not flexible to support the respective light sources 100a, and the connecting portions 130 of the substrate 100b may be formed of a soft material which is flexible. Consequently, the substrate 100b of the light source module 100 may be manufactured so as to be applied to an object having curvature.

As described above, the substrate 100b of the light source module 100 may be formed of the soft material, and therefore, the substrate 100b may be curved. However, the substrate 100b of the light source module 100 may be curved due to structural deformation thereof.

For example, the supporting portions 120 of the substrate 100b may have a first thickness, and the connecting portions 130 of the substrate 100b may have a second thickness. The first thickness may be different from the second thickness so that the substrate 100b can be curved.

As an example, if the second thickness of the connecting portions 130 of the substrate 100b is less than the first thickness of the supporting portions 120 of the substrate 100b, the substrate 100b may be curved due to the connecting portions 130 of the substrate 100b, and therefore, the substrate 100b of the light source module 100 may be applied to an object having curvature.

Also, a reflective coating film or reflective coating material layer may be formed at the substrate 100b of the light source module 100 to reflect light generated by the light sources 100a toward the optical member 600.

The reflective coating film or reflective coating material layer may contain a metal, such as aluminum (Al), silver (Ag), or gold (Au), exhibiting high reflectance or a metal oxide, such as titanium oxide ($TiO_2$), exhibiting high reflectance.

Conductive patterns to apply current to drive the light sources 100a may be disposed at the substrate 100b of the light source module 100.

As an example, the conductive patterns may be disposed throughout the entire area of the substrate 100b including the supporting portions 120 and the connecting portions 130, only at the supporting portions 120 of the substrate 100b supporting the light sources 100a, or only at the connecting portions 130 of the substrate 100b interconnecting neighboring supporting portions 120 to electrically interconnect neighboring light sources 100a.

Each light source 100a of the light source module 100 may be a top view type light emitting diode. According to circumstances, each light source 100a of the light source module 100 may be a side view type light emitting diode.

Each light source 100a of the light source module 100 may be a light emitting diode (LED) chip. The LED chip may be a red LED chip, blue LED chip, or ultraviolet LED chip. Alternatively, the LED chip may be at least one selected from among a red LED chip, green LED chip, blue LED chip, yellow green LED chip, and white LED chip, or a combination thereof.

A white LED may be realized using a yellow phosphor on a blue LED or simultaneously using a red phosphor and green phosphor on a blue LED. Also, a white LED may be realized simultaneously using a yellow phosphor, red phosphor, and green phosphor on a blue LED.

As an example, in a case in which the lamp is applied to a taillight of a vehicle, each light source 100a of the light source module 100 may be a vertical lighting emitting chip, such as a red lighting emitting chip. However, embodiments are not limited thereto.

Each light source 100a of the light source module 100 may include a lens 200. The lens 200 may include a groove disposed at a position corresponding to the central area of a light emission surface of each light source 100a.

The groove is formed at the lens 200 to widen an orientation angle of light emitted from each light source 100a. However, embodiments are not limited thereto, and various types of lenses may be used.

Meanwhile, the optical member 600 may be spaced apart from the substrate 100b by a predetermined distance. A light mixing area may be formed between the substrate 100b and the optical member 600.

The cover member 700 may be omitted, and the optical member 600 may function as the cover member 700.

According to circumstances, the optical member 600 may be omitted, and only the cover member 700 may be provided.

The optical member 600 may include at least one plate 610.

The plate 610 may include a bottom surface 610b adjacent to the light source module 100 and a top surface 610a opposite the bottom surface 610b. At the top surface 610a of the plate 610 may be disposed a first pattern 630 to display a predetermined emblem.

At the top surface 610a of the plate 610 excluding the first pattern 630 may be disposed a second pattern 620 to condense light incident from the light source module 100.

Between the first pattern 630 and the second pattern 620 may be disposed a ground pattern 640 surrounding the first pattern 630.

The ground pattern 640 may be different from the second pattern 620. According to circumstances, the ground pattern 640 may be identical to the second pattern 620.

The first pattern 630 may be at least one selected from among an embossed pattern, an engraved pattern, and a printed pattern. According to circumstances, the first pattern 630 may contain a plurality of fluorescent particles.

The second pattern 620 may be a protrusion protruding upward from the top surface of the plate 610. The vertical section of the protrusion may include a first surface and second surface facing each other. The angle between the first surface and second surface may be an obtuse angle or acute angle.

In this embodiment, the second pattern 620 may include a plurality of protrusions arranged side by side in one direction. The protrusions may be formed in a stripe shape.

Also, the optical member 600 may include a third pattern (not shown) disposed at the bottom surface 610b of the plate 610 to diffuse light incident from the light source module 100.

The third pattern (not shown) may be a groove disposed at the bottom surface 610b of the plate 610. The groove may be concave in vertical section.

The plate 610 of the optical member 600 may include a curved surface having at least one curvature.

The plate 610 of the optical member 600 may have a surface having at least one selected from a concave surface, convex surface, and flat surface according to the shape of the cover member 700 or an object, to which the lamp is mounted.

The distance between the optical member 600 and the light source module 100 may be about 10 mm or more.

If the distance between the optical member 600 and the light source module 100 is less than about 10 mm, the lamp may not exhibit uniform brightness. As a result, a hot spot phenomenon having high brightness at the area at which each light source 100a is located may occur. On the contrary, a dark spot phenomenon having low brightness may occur.

The heat dissipation member 400 may be disposed under the substrate 100b of the light source module 100.

The heat dissipation member 400 may dissipate heat generated from the light sources 100a.

The heat dissipation member 400 may be formed of a material exhibiting high thermal conductivity, such as aluminum, an aluminum alloy, copper, or a copper alloy.

Alternatively, the substrate 100b of the light source module 100 and the heat dissipation member 400 may be integrated to constitute a metal core printed circuit board (MCPCB), or an additional heat dissipation member 400 may be disposed at the bottom surface of the MCPCB.

In a case in which such an additional heat dissipation member is attached to the bottom surface of the MCPCB, such attachment may be achieved using an acryl bonding agent (not shown).

The cover member 700 may include a top cover 700a and a side cover 700b. The top cover 700a may be formed of a light transmissive material, and the side cover 700b may be formed of an opaque material.

According to circumstances, both the top cover 700a and side cover 700b may be formed of a light transmissive material.

The cover member 700 may be formed of a material (for example, acryl) capable of protecting the light source module 100 including the substrate 100b and the light sources 100a from external impact and transmitting light emitted from the light source module 100.

Also, the cover member 700 may include a curved portion in terms of design. The substrate 100b of the light source module is flexible and thus may be easily received in the curved cover member 700.

A reflector 710 may be disposed at the inside of the side cover 700b of the cover member 700.

The cover member 700 may be disposed in contact with the optical member 600. Only a portion of the cover member 700 may contact the optical member 600, and the remaining portion of the cover member 700 may be spaced apart from the optical member 600 by a predetermined distance.

According to circumstances, the entire surface of the cover member 700 facing the optical member 600 may contact the optical member 600.

Also, the entire surface of the cover member 700 facing the optical member 600 may be spaced apart from the optical member 600 by a predetermined distance.

The distance between the cover member 700 and the optical member 600 may be varied based on design conditions of the light source module required by an object, to which the light source module is mounted, to provide uniform brightness throughout.

The plate 610, the first pattern 630, the second pattern 620, and the ground pattern 640 of the optical member 600 may be separately manufactured and then coupled to one another. According to circumstances, the components of the optical member 600 may be selectively integrated.

Also, the optical member 600 and the cover member 700 may be integrated.

In this embodiment, the optical member including various patterns is used as described above, and therefore, it is possible to display the emblem and to condense light.

Also, in this embodiment, an additional optical member, such as a prism sheet, may be removed. Consequently, the weight of the lamp is reduced, and manufacturing cost of the lamp is reduced.

Also, in this embodiment, the flexible optical member and light source module are used, and therefore, the lamp may be applied to an object having curvature.

In this embodiment, therefore, it is possible to improve economy of the lamp and a degree of freedom in product design.

Figure 36:
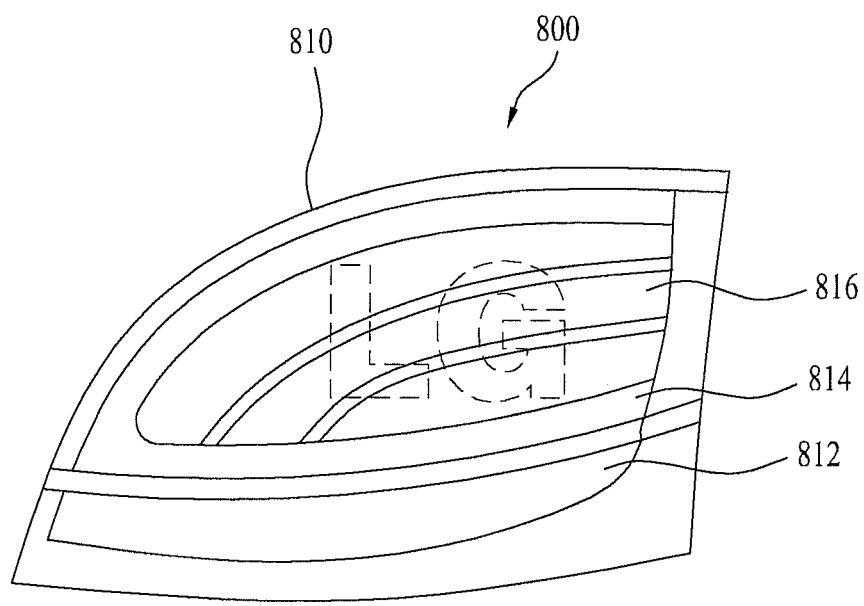
FIG. 36 is a view showing a taillight for vehicles including lamps according to an embodiment.

FIG. 36 is a view showing a taillight for vehicles including lamps according to an embodiment.

As shown in FIG. 36, a taillight 800 for vehicles may include a first lamp 812, second lamp 814, third lamp 816, and housing 810.

The first lamp 812 may be a light source functioning as a direction indicating light, the second lamp 814 may be a light source functioning as a breadth indicating light, and the third lamp 816 may be a light source functioning as a stoplight. However, embodiments are not limited thereto. For example, the functions of the first lamp 812, second lamp 814, and third lamp 816 may be changed.

The housing 810 may receive the first, second, and third lamps 812, 824, and 816. The housing 810 may be formed of a light transmissive material.

The housing 810 may be curved according to the design of a vehicle body. The first, second, and third lamps 812, 824, and 816 may realize surface light sources that can be curved according to the shape of the housing 810.

The housing 810 may include an optical member and a cover member. The optical member and the cover member may be separated or integrated.

A plate, first pattern, second pattern, and ground pattern of the optical member may be separately manufactured and then coupled to one another. According to circumstances, the components of the optical member may be selectively integrated.

In the taillight 800 for vehicles, therefore, the optical member including various patterns is used to display an emblem and to condense light.

In this embodiment, the optical member including various patterns is used as described above, and therefore, it is possible to display the emblem and to condense light.

Also, it is possible to provide an intensity of light suitable for safety conditions of a vehicle lamp. Consequently, it is possible to improve economy of the lamp and a degree of freedom in product design.

Figure 37:
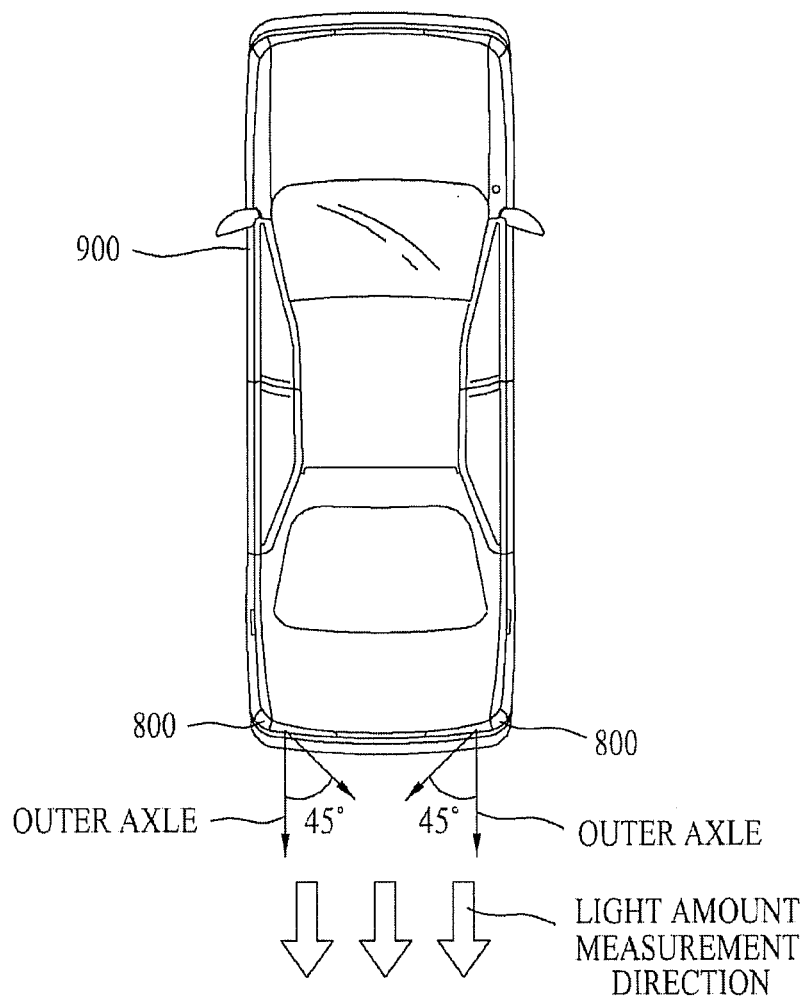
FIG. 37 is a plan view showing a vehicle including the lamp according to the embodiment.

FIG. 37 is a plan view showing a vehicle including the lamp according to the embodiment.

In a case in which the lamp is applied to a taillight of a vehicle, as shown in FIG. 37, a safety standard of the lamp applied to the taillight of the vehicle must satisfy the following conditions. That is, when viewed from a horizontal angle of an outer axle of the vehicle of 45 degrees from the central point of light, a projected area must be about 12.5 cm$^2$ or more, and, for example, the brightness of a brake lamp must be about 40 to 420 candela (cd).

When the amount of light is measured in a light amount measurement direction, therefore, the taillight of the vehicle must provide an amount of light equal to or greater than a reference value.

The lamp according to this embodiment realizes a surface light source that is capable of providing an amount of light equal to or greater than the reference value in the light amount measurement direction, i.e. a predetermined reference direction, and displays an emblem. Consequently, it is possible to provide excellent advertisement and public information effects and to improve economy of the lamp and a degree of freedom in product design.

Embodiments have the following effects. First, an optical member including various patterns is used, and therefore, it is possible to display an emblem and to condense light.

Second, an additional optical member, such as a prism sheet, may be eliminated. Consequently, the weight of a lamp is reduced, and manufacturing cost of the lamp is reduced.

Third, an optical member including a plurality of lenses is used, and therefore, it is possible to three-dimensionally display an emblem.

Consequently, it is possible to provide excellent advertisement and public information effects.

Fourth, light source modules are disposed beside and under an optical member, and therefore, it is possible to improve vividness of the emblem in an environment as bright as the daytime as well as in the nighttime.

Fifth, a flexible optical member and light source module are used, and therefore, a lamp may be applied to an object having curvature.

Consequently, it is possible to improve economy of the lamp and a degree of freedom in product design.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lamp comprising:
   a light source module; and
   an optical member spaced apart from the light source module by a predetermined distance, wherein the optical member includes:
   at least one plate including a bottom surface adjacent to the light source module and a top surface opposite the bottom surface;
   a first pattern disposed on the top surface of the plate to display a predetermined emblem;
   a second pattern disposed at the top surface of the plate excluding the first pattern to condense light incident from the light source module; and
   a ground pattern disposed between the top surface of the plate and the first pattern,
   wherein a direction in which light is refracted by the ground pattern is different from a direction in which light is refracted by the first pattern.

2. The lamp according to claim 1, wherein the ground pattern is disposed between the first pattern and the second pattern to surround the first pattern.

3. The lamp according to claim 1, wherein the first pattern is at least one selected from among an embossed pattern, an engraved pattern, and a printed pattern.

4. The lamp according to claim 1, wherein the first pattern contains a plurality of fluorescent particles.

5. The lamp according to claim 1, wherein
   a shape of a lower portion of the first pattern is identical to a shape of a lower portion of the second pattern, and
   a shape of an upper portion of the first pattern is different from a shape of an upper portion of the second pattern.

6. The lamp according to claim 1, wherein the second pattern is a protrusion protruding upward from the top surface of the plate, a vertical section of the protrusion comprises a first surface and second surface facing each other, and an angle between the first surface and second surface is an obtuse angle or an acute angle.

7. The lamp according to claim 1, wherein the second pattern comprises a plurality of protrusions arranged side by side in one direction, and the protrusions are formed in a stripe shape.

8. The lamp according to claim 7, wherein the neighboring protrusions are spaced apart from each other by different distances.

9. The lamp according to claim 1, wherein the second pattern is identically disposed at the top surface and the bottom surface of the plate.

10. The lamp according to claim 1, wherein the optical member further includes a third pattern disposed at the bottom surface of the plate to diffuse light incident from the light source module.

11. The lamp according to claim 1, wherein the plate of the optical member comprises a curved surface having at least one curvature.

12. The lamp according to claim 1, wherein a distance between the optical member and the light source module is about 10 mm or more.

13. The lamp according to claim 1, further comprising a diffusion sheet disposed between the plate of the optical member and the light source module to diffuse incident light.

14. A lamp comprising:
   a light source module; and
   an optical member spaced apart from the light source module by a predetermined distance, wherein the optical member includes:
   at least one plate including a bottom surface adjacent to the light source module and a top surface opposite the bottom surface;
   a first pattern disposed on the top surface of the plate to display a predetermined emblem; and a second pattern disposed on the top surface of the plate excluding the first pattern to condense light incident from the light source module, wherein a shape of a lower portion of the first pattern is identical to a shape of a lower portion of the second pattern, wherein a shape of an upper portion of the first pattern is different from a shape of an upper portion of the second pattern, wherein the second pattern includes a plurality of protrusions, wherein each of the protrusions has an angle between a first surface and a second surface facing each other, and wherein each of the angles of the protrusions are different, and wherein the angles are gradually decreased toward the first pattern.

15. The lamp according to claim 14, wherein the first pattern contains a plurality of fluorescent particles.

16. The lamp according to claim 14, wherein the second pattern includes a first protrusion, a second protrusion and a third protrusion, wherein the first protrusion is adjacent to the second protrusion which is adjacent to the third protrusion, and wherein a distance between the first protrusion and the second protrusion is different from a distance between the second protrusion and the third protrusion.

17. A lamp comprising:
a light source module; and
an optical member spaced apart from the light source module by a predetermined distance, wherein the optical member includes:
at least one plate including a bottom surface adjacent to the light source module and a top surface opposite the bottom surface;
a first pattern disposed on the top surface of the plate to display a predetermined emblem; and
a second pattern disposed on the top surface of the plate excluding the first pattern to condense light incident from the light source module,
wherein the plate is inclined,
wherein at least one of the top surface and the bottom surface of the plate has at least one inflection point,
wherein the plate is divided into a first area and second area based on the inflection point, and
wherein an inclined surface of the first area of the plate has a first radius of curvature, an inclined surface of the second area of the plate has a second radius of curvature, and the first radius of curvature is different from the second radius of curvature.

18. The lamp according to claim 17, wherein the plate has a plurality of inflection points, and wherein inclined surfaces adjacent to each other based on each of the inflection points has different radii of curvature.

* * * * *